(12) United States Patent
Onuma

(10) Patent No.: US 11,567,455 B2
(45) Date of Patent: Jan. 31, 2023

(54) ELECTRONIC WATCH AND CONTROL METHOD FOR ELECTRONIC WATCH

(71) Applicant: Seiko Epson Corporation, Tokyo (JP)

(72) Inventor: Atsushi Onuma, Shiojiri (JP)

(73) Assignee: SEIKO EPSON CORPORATION

( * ) Notice: Subject to any disclaimer, the term of this patent is extended or adjusted under 35 U.S.C. 154(b) by 172 days.

(21) Appl. No.: 17/084,729

(22) Filed: Oct. 30, 2020

(65) Prior Publication Data
US 2021/0132546 A1 May 6, 2021

(30) Foreign Application Priority Data

Oct. 31, 2019 (JP) .............................. JP2019-198376

(51) Int. Cl.
*H02P 8/02* (2006.01)
*H02P 8/12* (2006.01)
*H02P 6/16* (2016.01)
*G04C 3/14* (2006.01)

(52) U.S. Cl.
CPC ............. *G04C 3/143* (2013.01); *G04C 3/146* (2013.01); *H02P 8/02* (2013.01)

(58) Field of Classification Search
CPC ..................................... H02P 8/34; H02P 8/26
See application file for complete search history.

(56) References Cited

U.S. PATENT DOCUMENTS

| | | | |
|---|---|---|---|
| 6,452,358 B1 * | 9/2002 | Iijima | G04C 10/00 318/140 |
| 2013/0081069 A1 * | 3/2013 | Kawakami | G11B 7/08582 720/659 |
| 2015/0123591 A1 * | 5/2015 | Inoue | H02P 8/12 318/696 |

FOREIGN PATENT DOCUMENTS

| | | |
|---|---|---|
| JP | H04-033597 A | 2/1992 |
| JP | 2003-259692 A | 9/2003 |
| JP | 2010-266302 A | 11/2010 |

* cited by examiner

*Primary Examiner* — Muhammad S Islam
*Assistant Examiner* — Charles S Laughlin
(74) *Attorney, Agent, or Firm* — Harness, Dickey & Pierce, P.L.C.

(57) ABSTRACT

A wristwatch includes a first motor that drives a first hour hand, a first control circuit electrically coupled to the first motor and outputting a first motor drive signal, and a second control circuit electrically coupled to the first motor and outputting a second motor drive signal. When the first control circuit outputs the first motor drive signal, the second control circuit is in a high impedance state to the input of the first motor drive signal, and when the second control circuit outputs the second motor drive signal, the first control circuit is in the high impedance state to the input of the second motor drive signal.

6 Claims, 12 Drawing Sheets

ELECTRONIC WATCH AND CONTROL METHOD FOR ELECTRONIC WATCH

The present application is based on, and claims priority from JP Application Serial Number 2019-198376, filed Oct. 31, 2019, the present disclosure of which is hereby incorporated by reference herein in its entirety.

BACKGROUND

1. Technical Field

The present disclosure relates to an electronic watch and a control method for an electronic watch.

2. Related Art

A stepping motor is incorporated into an analog electronic watch. In an electronic device in which a battery is compact and is a power source, such as an analog electronic watch, it is preferable to achieve power saving by reducing energy that drives the stepping motor. An electronic watch devised to save power is disclosed in JP-A-2003-259692. According to JP-A-2003-259692, a waveform of a drive signal that drives the motor is a pulse waveform, and the shorter the pulse width of the pulse waveform, the smaller the energy consumed by the motor. A drive integrated circuit (IC), which forms a drive circuit that outputs a drive signal to operate hands every second, is used in the electronic watch. It is assumed that the drive circuit is used in a single-function analog watch or the like that is provided with three hands, namely, a seconds hand, a minute hand, and an hour hand.

On the other hand, in a high-function watch such as a multi-function watch or a wave correction watch, for example, when a standard radio wave is received and time adjustment is performed, a control is required to fast-forward the seconds hand or the like.

However, in the drive circuit of JP-A-2003-259692, it is difficult to perform such control. Further, it is also conceivable to modify the drive circuit and add a fast-forward control function, but this results in an increase in size of the drive IC, a cost increase, and the like, and it is thus difficult to employ the drive IC in the single-function analog watch. A high initial cost is also required to modify the drive circuit. In other words, an object of the present disclosure is to provide an electronic watch and a control method for an electronic watch that can efficiently modify a necessary control in accordance with a specification of a product in which the drive circuit is to be mounted.

SUMMARY

An electronic watch includes a motor configured to drive a pointer, a first control circuit electrically coupled to the motor and configured to output a first motor drive signal, and a second control circuit electrically coupled to the motor and configured to output a second motor drive signal. When the first control circuit outputs the first motor drive signal, the second control circuit is in a high impedance state to the input of the first motor drive signal, and when the second control circuit outputs the second motor drive signal, the first control circuit is in a high impedance state to the input of the second motor drive signal.

In the above-described electronic watch, the first motor drive signal may have a first pulse waveform that rotates the motor, the first pulse waveform being output at a predetermined interval to rotate the motor, and the second motor drive signal may have a second pulse waveform that rotates the motor and is selected from among a plurality of pulse waveforms having different pulse widths, the second pulse waveform being output at a time interval shorter than the predetermined time interval to rotate the motor.

In the above-described electronic watch, a plurality of the motors may be electrically coupled to the first control circuit and the second control circuit.

A control method is a control method for an electronic watch including a motor that drives a pointer, a first control circuit electrically coupled to the motor and outputting a first motor drive signal, and a second control circuit electrically coupled to the motor and outputting a second motor drive signal. The control method includes setting the second control circuit to a high impedance state to input of the first motor drive signal, causing the first control circuit to output the first motor drive signal to the motor, stopping the first control circuit from outputting the first motor drive signal, setting the first control circuit to a high impedance state to input of the second motor drive signal, and causing the second control circuit to output the second motor drive signal to the motor.

An electronic watch includes a motor configured to drive a pointer, a control circuit electrically coupled to the motor and configured to output a first motor drive signal, and a inspection terminal electrically coupled to the motor and to which a second motor drive signal is input. When the second motor drive signal is input to the inspection terminal, the control circuit is in a high impedance state to input of the second motor drive signal.

A test method is a test method for an electronic watch including a a motor that drives a pointer, a control circuit electrically coupled to the motor and outputting a first motor drive signal, and a inspection terminal electrically coupled to the motor and to which a second motor drive signal is input. The test method includes setting the control circuit to a high impedance state to input of the second motor drive signal, and driving the motor by the second motor drive signal input from the inspection terminal.

DESCRIPTION OF EXEMPLARY EMBODIMENTS

First Embodiment

Figure 1:
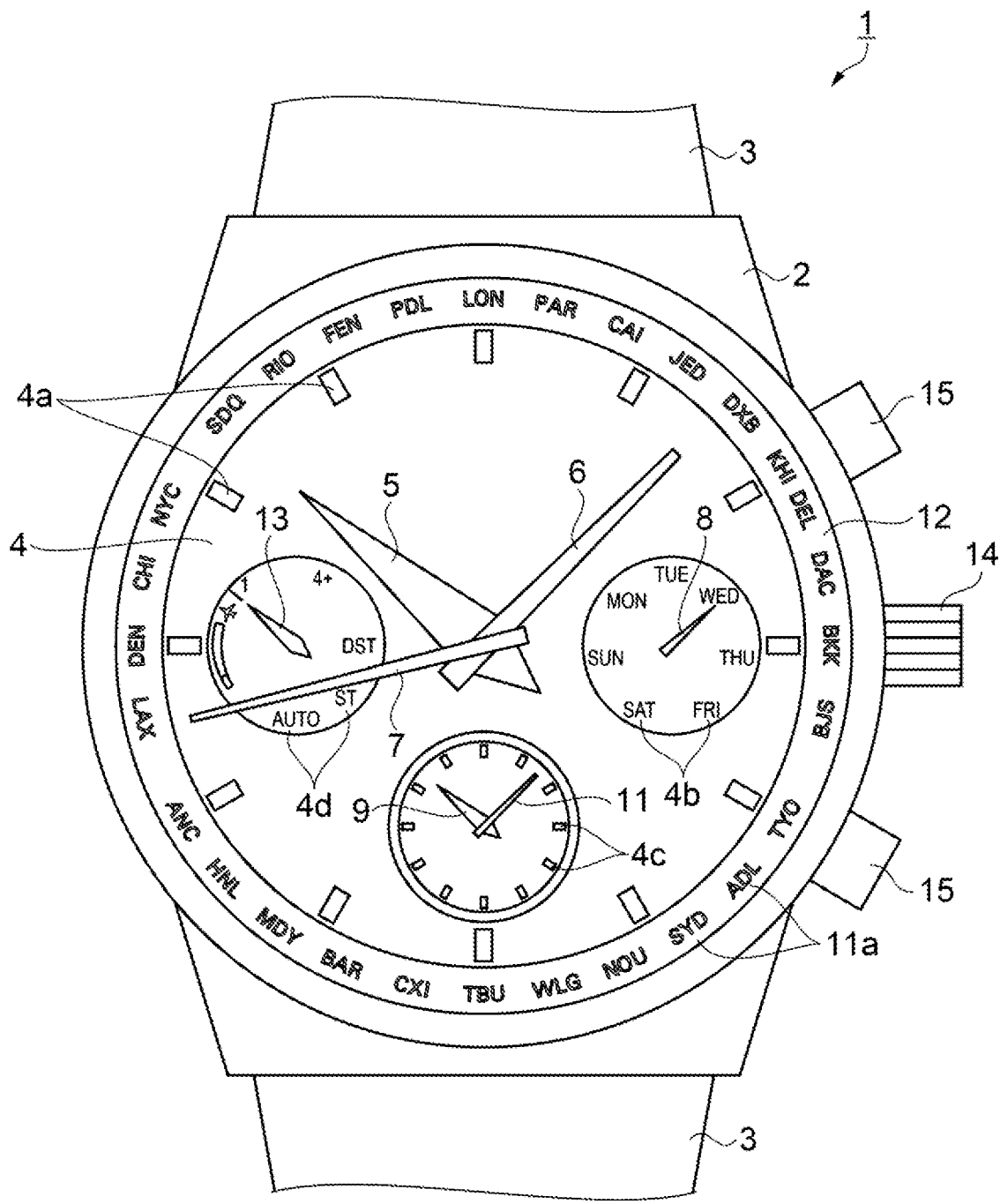
FIG. 1 is a schematic plan view illustrating a configuration of an electronic watch according to a first embodiment.

In a present embodiment, characteristic examples of an electronic watch and a drive method for driving the electronic watch will be described with reference to the drawings. An electronic watch according to a first embodiment will be described with reference to FIG. 1 to FIG. 11. FIG. 1 is a schematic plan view illustrating a configuration of the electronic watch. As illustrated in FIG. 1, a wristwatch 1, which is an example of the electronic watch, is provided with a case 2. A band 3 is disposed on upper and lower sides of the case 2 in FIG. 1. The case 2 and the band 3 form a ring, and the wristwatch 1 is fixed to the arm by placing the ring on the arm and adjusting the size of the ring.

In the center of FIG. 1, a circular disk-shaped dial 4 is disposed in the case 2. First markers 4a are concentrically disposed around the dial 4. A first hour hand 5 that is a pointer, a first minute hand 6 that is a pointer, and a seconds hand 7 that is a pointer, each of the pointers indicating a time, are disposed in the center of the dial 4. The first markers 4a form a scale by which the first hour hand 5, the first minute hand 6, and the seconds hand 7 indicate the time.

A day indicator hand 8, which indicates a day of the week, is disposed on the right side of the dial 4 in FIG. 1. Second markers 4b, which form a scale of the day indicator hand 8, are concentrically disposed around the day indicator hand 8. The second markers 4b are displayed using a three letter code in which the alphabet is abbreviated to "SUN" indicating Sunday, for example.

A second hour hand 9 that is a pointer, and a second minute hand 11 that is a pointer are disposed on the lower side of the dial 4 in FIG. 1. Third markers 4c are concentrically disposed around the second hour hand 9 and the second minute hand 11. The third markers 4c form a scale by which the second hour hand 9 and the second minute hand 11 indicate the time. The wristwatch 1 indicates two times, that is, the time indicated by the first hour hand 5 and the first minute hand 6 and the time indicated by the second hour hand 9 and the second minute hand 11. The wristwatch 1 displays the time of two locations on the Earth.

A bezel 12 is arranged on the outer circumferential side of the first markers 4a. City information representing representative city names of time zones is displayed on the bezel 12. The city information is displayed using a three letter code in which the alphabet is abbreviated to a city name 11a, such as "TYO" indicating Tokyo, for example. An operator may manipulate the bezel 12 or operation buttons 15 described below to specify a time zone of the time indicated by the second hour hand 9 and the second minute hand 11.

A mode indicator hand 13 is disposed on the left side of the dial 4 in FIG. 1. Fourth markers 4d are concentrically disposed around the mode indicator hand 13. The fourth markers 4d form a scale by which the mode indicator hand 13 indicates mode content. The wristwatch 1 is provided with a function of receiving satellite radio waves to correct the time. A mode for receiving the satellite radio waves is indicated by the fourth markers 4d.

A crown 14 is disposed on the right side of the case 2 in FIG. 1. The crown 14 is used when adjusting the time indicated by first hour hand 5 and the first minute hand 6. The operator can rotate the first hour hand 5 and the first minute hand 6 by pulling out and rotating the crown 14.

The operation buttons 15 are disposed on the upper right side and the lower right side of the case 2 in FIG. 1. By operating the operation buttons 15, the operator can cause the wristwatch 1 to perform various functions. For example, when causing the wristwatch 1 to perform a function to receive the satellite radio waves, the operator operates the operation buttons 15 to cause the wristwatch 1 to start and stop reception, and the like.

Figure 2:
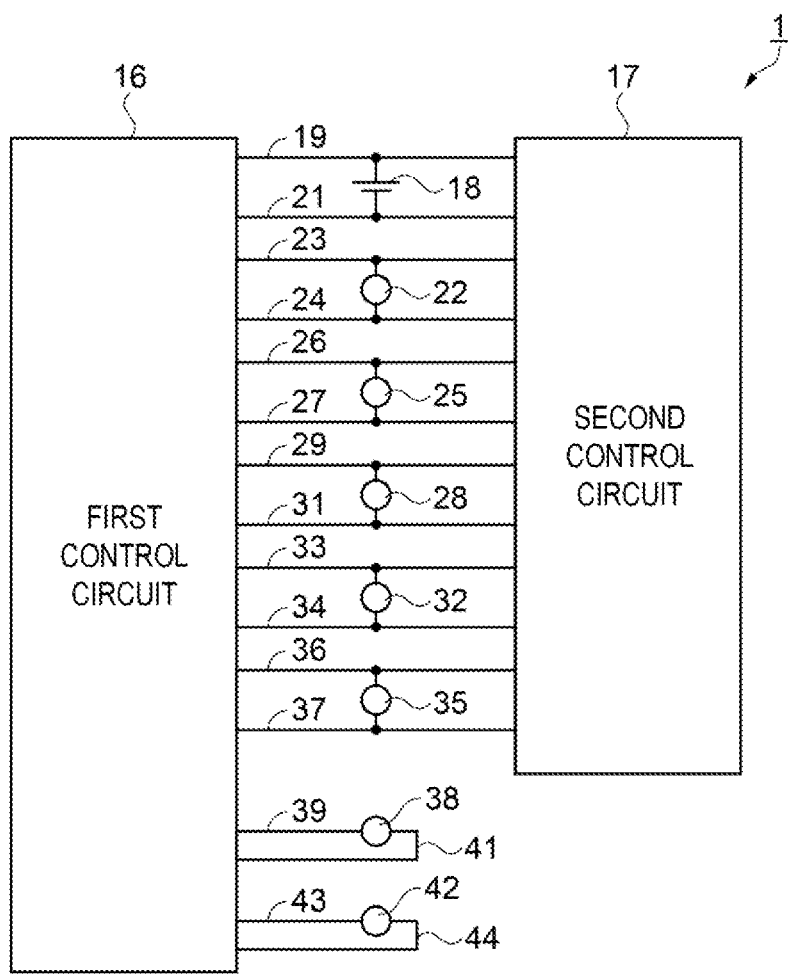
FIG. 2 is a block diagram illustrating a circuit configuration of the electronic watch.

FIG. 2 is a block diagram illustrating a circuit configuration of the electronic watch. As illustrated in FIG. 2, the wristwatch 1 is provided with a first control circuit 16 and a second control circuit 17. The wristwatch 1 is provided with a battery 18. An anode of the battery 18 is electrically coupled to the first control circuit 16 and the second control circuit 17 by first wiring 19. A cathode of the battery 18 is electrically coupled to the first control circuit 16 and the second control circuit 17 by second wiring 21. The power of the battery 18 is supplied to the first control circuit 16 and the second control circuit 17.

The wristwatch 1 is provided with a first motor 22 as a motor that drives the first hour hand 5. The first motor 22 is electrically coupled to the first control circuit 16 by third wiring 23 and fourth wiring 24. The first control circuit 16 outputs a first motor drive signal to the first motor 22 to drive the first motor 22. The first motor 22 is also electrically coupled to the second control circuit 17 by the third wiring 23 and the fourth wiring 24. The second control circuit 17 outputs a second motor drive signal to the first motor 22 to drive the first motor 22. The first motor 22 is driven by the first control circuit 16 and the second control circuit 17. Note that the first motor drive signal is a drive signal output from the first control circuit 16, and the second motor drive signal is a drive signal output from the second control circuit 17.

The wristwatch 1 is provided with a second motor 25 as a motor that drives the first minute hand 6. The second motor 25 is electrically coupled to the first control circuit 16 by fifth wiring 26 and sixth wiring 27. The second motor 25 is also electrically coupled to the second control circuit 17 by the fifth wiring 26 and the sixth wiring 27. The second motor 25 is driven by the first control circuit 16 and the second control circuit 17.

The wristwatch 1 is provided with a third motor 28 as a motor that drives the seconds hand 7. The third motor 28 is electrically coupled to the first control circuit 16 by seventh wiring 29 and eighth wiring 31. The third motor 28 is also electrically coupled to the second control circuit 17 by the seventh wiring 29 and the eighth wiring 31. The third motor 28 is driven by the first control circuit 16 and the second control circuit 17.

The wristwatch 1 is provided with a fourth motor 32 as a motor that drives the second hour hand 9. The fourth motor 32 is electrically coupled to the first control circuit 16 by ninth wiring 33 and tenth wiring 34. The fourth motor 32 is also electrically coupled to the second control circuit 17 by the ninth wiring 33 and the tenth wiring 34. The fourth motor 32 is driven by the first control circuit 16 and the second control circuit 17.

The wristwatch 1 is provided with a fifth motor 35 as a motor that drives the second minute hand 11. The fifth motor 35 is electrically coupled to the first control circuit 16 by eleventh wiring 36 and twelfth wiring 37. The fifth motor 35 is also electrically coupled to the second control circuit 17 by the eleventh wiring 36 and the twelfth wiring 37. The fifth motor 35 is driven by the first control circuit 16 and the second control circuit 17.

The first motor 22 to the fifth motor 35 are electrically coupled to the first control circuit 16 and the second control circuit 17.

The wristwatch 1 is provided with a sixth motor 38 that drives the day indicator hand 8. The sixth motor 38 is electrically coupled to the first control circuit 16 by thirteenth wiring 39 and fourteenth wiring 41. The wristwatch 1 is provided with a seventh motor 42 that drives the mode indicator hand 13. The seventh motor 42 is electrically coupled to the first control circuit 16 by fifteenth wiring 43 and sixteenth wiring 44. The sixth motor 38 and the seventh motor 42 are driven by the first control circuit 16.

Figure 3:
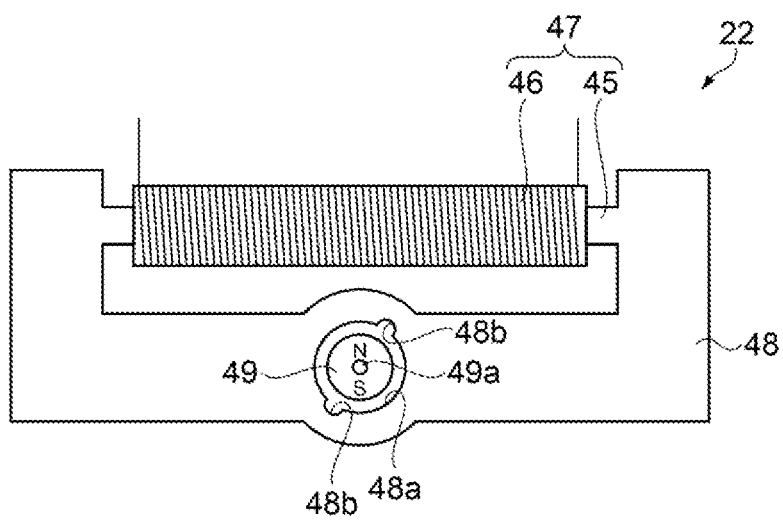
FIG. 3 is a schematic plan view illustrating a structure of a motor.

FIG. 3 is a schematic plan view illustrating the structure of the motor. Each of the first motor 22 to the seventh motor 42 has substantially the same structure. The structure of the first motor 22 will be described, and a description of the second motor 25 to the seventh motor 42 will be omitted. As illustrated in FIG. 3, the first motor 22 is provided with an electromagnet 47 in which a coil 46 is wound around a magnetic core 45. The magnetic core 45 is linear, and a stator 48 is arranged parallel to the magnetic core 45. The magnetic core 45 and the stator 48 are formed from a magnetic material, such as pure iron.

A through hole 48a is formed in substantially the middle of the stator 48. A rotor 49 is disposed in the through hole 48a. A shaft 49a is disposed in the center of the rotor 49. The shaft 49a is rotatably supported by a pair of bearings. The rotor 49 is magnetized in a direction orthogonal to the shaft 49a. A pair of a north pole and a south pole are formed in the rotor 49.

A pair of notches 48b are formed in the through hole 48a. At the notches 48b, the through hole 48a is indented in the radial direction. A cross-sectional area of the stator 48 is narrower in the vicinity of the notches 48b.

When a current is passed through the coil 46, lines of magnetic force is generated in the magnetic core 45. The lines of magnetic force advance from the magnetic core 45 to the stator 48. Since a density of the lines of magnetic force increases in the notches 48b, some of the lines of magnetic force leak out into the through hole 48a. The rotor 49 rotates as a result of the leaked lines of magnetic force acting on the rotor 49. The rotor 49 stops at a position at which it becomes stable due to electromagnetic forces acting between the rotor 49 and the stator 48. A current of a pulse waveform whose flow direction is alternately switched is passed through the coil 46. The rotor 49 is rotated by a half rotation by one pulse of the current.

Figure 4:
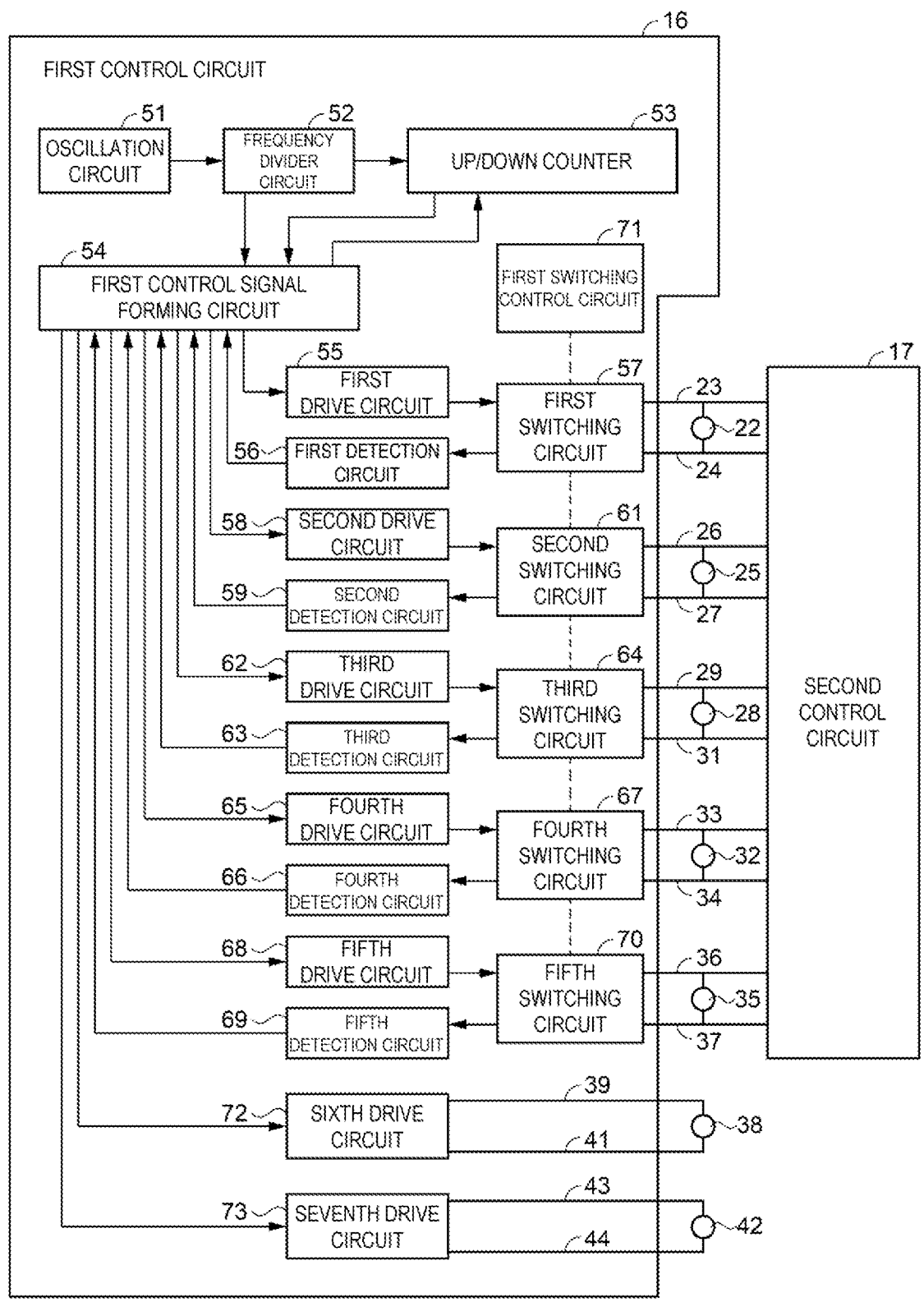
FIG. 4 is a block diagram illustrating a circuit configuration of a first control circuit.

FIG. 4 is a block diagram illustrating a circuit configuration of the first control circuit. As illustrated in FIG. 4, the first control circuit 16 is provided with an oscillation circuit 51. The oscillation circuit 51 is provided with a tuning fork type crystal resonator, which oscillates at 32768 Hz as an oscillation source, for example. The oscillation circuit 51 forms an oscillating signal. The oscillation circuit 51 is electrically coupled to a frequency divider circuit 52.

The frequency divider circuit 52 inputs the oscillating signal. The frequency divider circuit 52 inputs and sequentially divides the oscillation signal. The frequency divider circuit 52 forms a second signal that rises up every 1 second. The frequency divider circuit 52 is electrically coupled to an up/down counter 53 and a first control signal forming circuit 54. The frequency divider circuit 52 outputs a second signal to the up/down counter 53 and the first control signal forming circuit 54.

The up/down counter 53 counts the second signal 60 times and outputs a minute signal to the first control signal forming circuit 54 every minute. Furthermore, the up/down counter 53 counts the minute signal 60 times and outputs an hour signal to the first control signal forming circuit 54 every hour. In addition, the up/down counter 53 includes a function of counting a number of pulses of a signal output by the first control signal forming circuit 54.

The first control signal forming circuit 54 computes a time and outputs a drive command signal that drives the first motor 22 to the seventh motor 42 at predetermined timings. A first drive circuit 55 and a first detection circuit 56 are electrically coupled to the first control signal forming circuit 54. A first switching circuit 57 is electrically coupled to the first drive circuit 55 and the first detection circuit 56. The first motor 22 is electrically coupled to the first switching circuit 57 via the third wiring 23 and the fourth wiring 24.

The first motor 22 is the motor that drives the first hour hand 5. The first control signal forming circuit 54 outputs an hour signal to the first drive circuit 55 every hour. When the first control circuit 16 drives the first motor 22, the first switching circuit 57 is in an on state. When the first switching circuit 57 to a fifth switching circuit 70 are in an on state, signals can be respectively output to the first motor 22 to the fifth motor 35. The first drive circuit 55 inputs an hour signal, and outputs the first motor drive signal to the first motor 22 via the first switching circuit 57. The first motor 22 is driven by the first motor drive signal. The first detection circuit 56 detects, via the first switching circuit 57, the current flowing in the first motor 22. The first detection circuit 56 detects whether or not the first motor 22 has rotated, and outputs, to the first control signal forming circuit 54, a rotation signal indicating the detection result. The first control signal forming circuit 54 inputs the rotation signal to control the first motor 22.

A second drive circuit 58 and a second detection circuit 59 are electrically coupled to the first control signal forming circuit 54. A second switching circuit 61 is electrically coupled to the second drive circuit 58 and the second detection circuit 59. The second motor 25 is electrically coupled to the second switching circuit 61 via the fifth wiring 26 and the sixth wiring 27.

The second motor 25 is the motor that drives the first minute hand 6. The first control signal forming circuit 54 outputs a minute signal to the second drive circuit 58 every minute. When the first control circuit 16 drives the second motor 25, the second switching circuit 61 is in an on state. The second drive circuit 58 inputs the minute signal, and outputs the first motor drive signal to the second motor 25 via the second switching circuit 61. The second motor 25 is driven by the first motor drive signal. The second detection circuit 59 detects, via the second switching circuit 61, the current flowing in the second motor 25. The second detection circuit 59 detects whether or not the second motor 25 has rotated, and outputs, to the first control signal forming circuit 54, a rotation signal indicating the detection result. The first control signal forming circuit 54 inputs the rotation signal to control the second motor 25.

A third drive circuit 62 and a third detection circuit 63 are electrically coupled to the first control signal forming circuit 54. A third switching circuit 64 is electrically coupled to the third drive circuit 62 and the third detection circuit 63. The third motor 28 is electrically coupled to the third switching circuit 64 via the seventh wiring 29 and the eighth wiring 31.

The third motor 28 is the motor that drives the seconds hand 7. The first control signal forming circuit 54 outputs a second signal to the third drive circuit 62 every second.

When the first control circuit 16 drives the third motor 28, the third switching circuit 64 is in an on state. The third drive circuit 62 inputs the second signal, and outputs the first motor drive signal to the third motor 28 via the third switching circuit 64. The third motor 28 is driven by the first motor drive signal. The third detection circuit 63 detects, via the third switching circuit 64, the current flowing in the third motor 28. The third detection circuit 63 detects whether or not the third motor 28 has rotated, and outputs, to the first control signal forming circuit 54, a rotation signal indicating the detection result. The first control signal forming circuit 54 inputs the rotation signal to control the third motor 28.

A fourth drive circuit 65 and a fourth detection circuit 66 are electrically coupled to the first control signal forming circuit 54. A fourth switching circuit 67 is electrically coupled to the fourth drive circuit 65 and the fourth detection circuit 66. The fourth motor 32 is electrically coupled to the fourth switching circuit 67 via the ninth wiring 33 and the tenth wiring 34.

The fourth motor 32 is the motor that drives the second hour hand 9. The first control signal forming circuit 54 outputs an hour signal to the fourth drive circuit 65 every hour. When the first control circuit 16 drives the fourth motor 32, the fourth drive circuit 65, whose fourth switching circuit 67 is in an on state, inputs the hour signal, and outputs the first motor drive signal to the fourth motor 32 via the fourth switching circuit 67. The fourth motor 32 is driven by the first motor drive signal. The fourth detection circuit 66 detects, via the fourth switching circuit 67, the current flowing in the fourth motor 32. The fourth detection circuit 66 detects whether or not the fourth motor 32 has rotated, and outputs, to the first control signal forming circuit 54, a rotation signal indicating the detection result. The first control signal forming circuit 54 inputs the rotation signal to control the fourth motor 32.

A fifth drive circuit 68 and a fifth detection circuit 69 are electrically coupled to the first control signal forming circuit 54. The fifth switching circuit 70 is electrically coupled to the fifth drive circuit 68 and the fifth detection circuit 69. The fifth motor 35 is electrically coupled to the fifth switching circuit 70 via the eleventh wiring 36 and the twelfth wiring 37.

The fifth motor 35 is the motor that drives the second minute hand 11. The first control signal forming circuit 54 outputs a minute signal to the fifth drive circuit 68 every minute. When the first control circuit 16 drives the fifth motor 35, the fifth switching circuit 70 is in an on state. The fifth drive circuit 68 inputs a minute signal, and outputs the first motor drive signal to the fifth motor 35 via the fifth switching circuit 70. The fifth motor 35 is driven by the first motor drive signal. The fifth detection circuit 69 detects, via the fifth switching circuit 70, the current flowing in the fifth motor 35. The fifth detection circuit 69 detects whether or not the fifth motor 35 has rotated, and outputs, to the first control signal forming circuit 54, a rotation signal indicating the detection result. The first control signal forming circuit 54 inputs the rotation signal to control the fifth motor 35.

The first switching circuit 57 to the fifth switching circuit 70 are electrically coupled to a first switching control circuit 71. When the first control circuit 16 drives the first motor 22 to the fifth motor 35, the first switching control circuit 71 switches all of the first switching circuit 57 to the fifth switching circuit 70 to the on state.

A sixth drive circuit 72 is electrically coupled to the first control signal forming circuit 54. The sixth motor 38 is electrically coupled to the sixth drive circuit 72 via the thirteenth wiring 39 and the fourteenth wiring 41.

The sixth motor 38 is the motor that drives the day indicator hand 8. The first control signal forming circuit 54 outputs a day signal to the sixth motor 38 every day. The sixth drive circuit 72 inputs the day signal and outputs the first motor drive signal to the sixth motor 38. The sixth motor 38 is driven by the first motor drive signal.

A seventh drive circuit 73 is electrically coupled to the first control signal forming circuit 54. The seventh motor 42 is electrically coupled to the seventh drive circuit 73 via the fifteenth wiring 43 and the sixteenth wiring 44.

The seventh motor 42 is the motor that drives the mode indicator hand 13. When the wristwatch 1 receives the satellite radio waves, the first control signal forming circuit 54 outputs a mode switching signal to the seventh drive circuit 73. The seventh drive circuit 73 inputs the mode switching signal and outputs the first motor drive signal to the seventh motor 42. The seventh motor 42 is driven by the first motor drive signal.

The first control signal forming circuit 54 stores eight types of pulse waveform signals having different pulse widths. In the hour signal, the minute signal, and the second signal, the pulse width is switched in accordance with a load of the motor. Eight pulse widths are prepared for each 0.24 msec, from 2.20 msec to 3.91 msec, for example. The pulse width of the first motor drive signal is the same as the pulse width of the hour signal output by the first control signal forming circuit 54. The first motor drive signal has a first pulse waveform that rotates the first motor 22. The first pulse waveform is output at a predetermined time interval, and rotates the first motor 22. The first pulse waveform is a waveform adjusted to a short pulse width within a range of pulse widths at which the first motor 22 can be rotated, and the first control circuit 16 rotates the first motor 22 at a time interval of every hour. A rotation control method in the first control circuit 16 for the second motor 25 to the fifth motor 35 is the same rotation control as for the first motor 22. The control method for the first motor 22 will be described, and a description of the control method for the second motor 25 to the fifth motor 35 will be omitted. The first control circuit 16 rotates the second motor 25 to the fifth motor 35 at predetermined time intervals.

Figure 5:
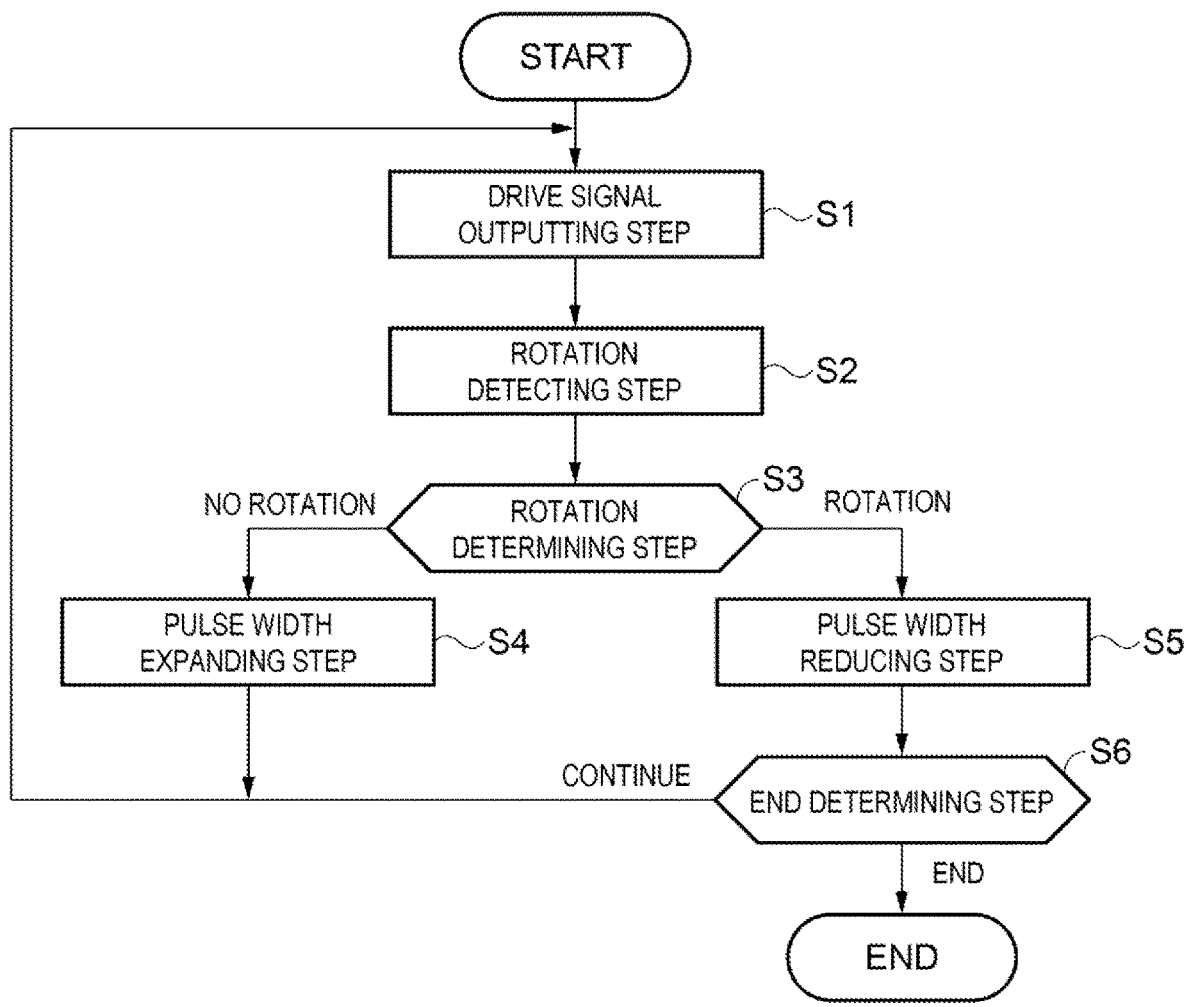
FIG. 5 is a flow diagram for describing a drive waveform control method.

FIG. 5 is a flow diagram for describing a drive waveform control method. In FIG. 5, step S1 is a drive signal outputting step. At this step, the first control signal forming circuit 54 sets the pulse width of the hour signal and outputs the hour signal to the first drive circuit 55. The first drive circuit 55 outputs, to the first motor 22, the first motor drive signal having the same pulse width as the hour signal, and drives the first motor 22. Next, processing proceeds to step S2.

Step S2 is a rotation detecting step. This step is a step at which the first detection circuit 56 detects the rotation of the first motor 22. The first detection circuit 56 detects the rotation of the first motor 22 on the basis of the amount of current flowing through the first motor 22. Next, the processing proceeds to step S3. Step S3 is a rotation determining step. When the first motor 22 does not rotate, the processing proceeds to step S4. When the first motor 22 rotates, the processing proceeds to step S5.

Step S4 is a pulse width expanding step. This step is a step at which the first control signal forming circuit 54 expands the pulse width of the hour signal. The first control signal forming circuit 54 expands the pulse width of the hour signal by 0.24 msec. When the pulse width reaches 3.91 msec, the pulse width is set to 3.91 msec. Next, the processing returns to step S1. At step S1, the first motor 22 is driven by the expanded first motor drive signal.

Step S5 is a pulse width reducing step. This step is a step at which the first control signal forming circuit 54 reduces the pulse width of the hour signal. The first control signal forming circuit 54 reduces the pulse width of the hour signal by 0.24 msec. When the pulse width reaches 2.20 msec, the pulse width is set to 2.20 msec. The first control signal forming circuit 54 causes the up/down counter 53 to count the number of pulses when the first motor 22 has rotated. Since the first motor 22 has rotated, 1 is added to the count number of the up/down counter 53. Next, the processing proceeds to step S6.

Step S6 is an end determining step. This step is a step of determining whether the driving of the first motor 22 is to be continued or ended. The driving ends when the count number of the up/down counter 53 matches a prearranged count number, and continues when the count number of the up/down counter 53 is less than the prearranged count number. When continuing the driving, next, the processing proceeds to step S1. At step S1, the first motor 22 is driven by the reduced first motor drive signal. When ending the driving, the step of driving the first motor 22 is ended.

When the first motor 22 rotates, the first motor drive signal is reduced at step S5. Accordingly, the first motor drive signal is the first pulse waveform that has been adjusted to the short pulse width within the range of pulse widths at which the first motor 22 can be rotated.

The first motor drive signal output by the first control circuit 16 to the first motor 22 rotates the first hour hand 5 at a one hour interval. The first motor drive signal is the first pulse waveform adjusted to the short pulse width within the range of pulse widths at which the first motor 22 can be rotated. The first motor 22 is driven efficiently as it rotates with low power consumption. The first control circuit 16 that outputs the first motor drive signal is less likely to be modified.

Figure 6:
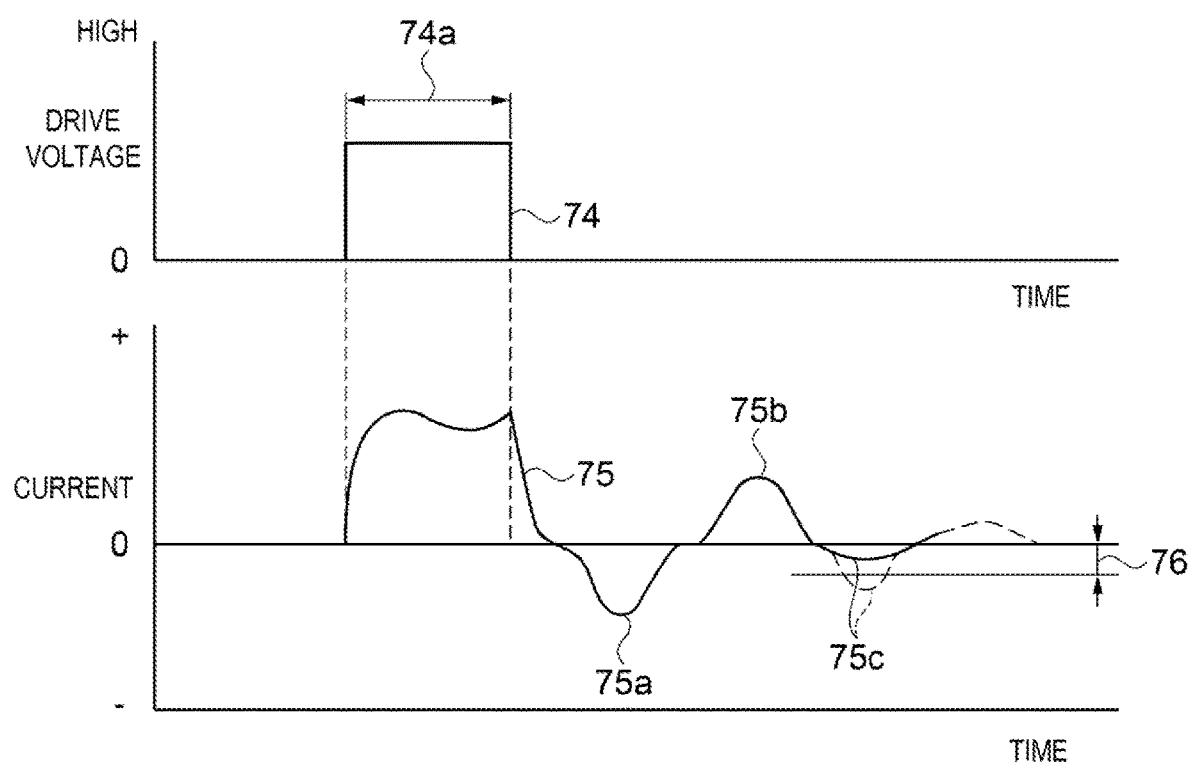
FIG. 6 is a time chart for describing rotation detection of the motor.

FIG. 6 is a time chart for describing the rotation detection of the motor. Two time charts are illustrated in FIG. 6. The horizontal axis indicates a transition in time, with time transitioning from left to right in the drawing. The upper vertical axis indicates a drive voltage, and the upper side in the drawing is a higher voltage than the lower side. A first motor drive waveform 74 that is the first pulse waveform indicates the waveform of the first motor drive signal output by the first drive circuit 55 to the first motor 22. The lower vertical axis indicates a current, and a direction of current flow is reversed between above and below the horizontal axis. A first current waveform 75 indicates a waveform of the current flowing in the coil 46 in correspondence to the first motor drive waveform 74.

The pulse width of the first motor drive waveform 74 is set by the first control signal forming circuit 54. At step S1, the first motor drive signal of the first motor drive waveform 74 is applied to the coil 46. When the first motor drive waveform 74 rises up, the first current waveform 75 rises. Next, when the first motor drive waveform 74 drops, the first current waveform 75 drops. After the first current waveform 75 has dropped, the rotor 49 oscillates in the first motor 22, causing an induced current to flow through the coil 46.

After the first current waveform 75 has dropped, the first current waveform 75 fluctuates vertically with respect to a line with a current value of 0. Peaks in the fluctuations of the first current waveform 75 are referred to, in order of occurrence, as a first peak 75$a$, a second peak 75$b$, and a third peak 75$c$. The first current waveform 75 indicated by a solid line in FIG. 6 indicates the waveform when the rotor 49 does not rotate. The first current waveform 75 indicated by a dashed line in FIG. 6 indicates the waveform when the rotor 49 has rotated.

When the rotor 49 has rotated, an absolute value of the current value of the third peak 75$c$ of the first current waveform 75 is larger, compared to when the rotor 49 has not rotated. A current determination value 76 for determining the rotation of the rotor 49 is stored in the first detection circuit 56. At step S2, the first detection circuit 56 compares the current value of the third peak 75$c$ with the current determination value 76. When the absolute value of the current value of the third peak 75$c$ is greater than the current determination value 76, the first control signal forming circuit 54 determines that the rotor 49 has rotated. When the absolute value of the current value of the third peak 75$c$ is less than the current determination value 76, the first detection circuit 56 determines that the rotor 49 has not rotated.

Figure 7:
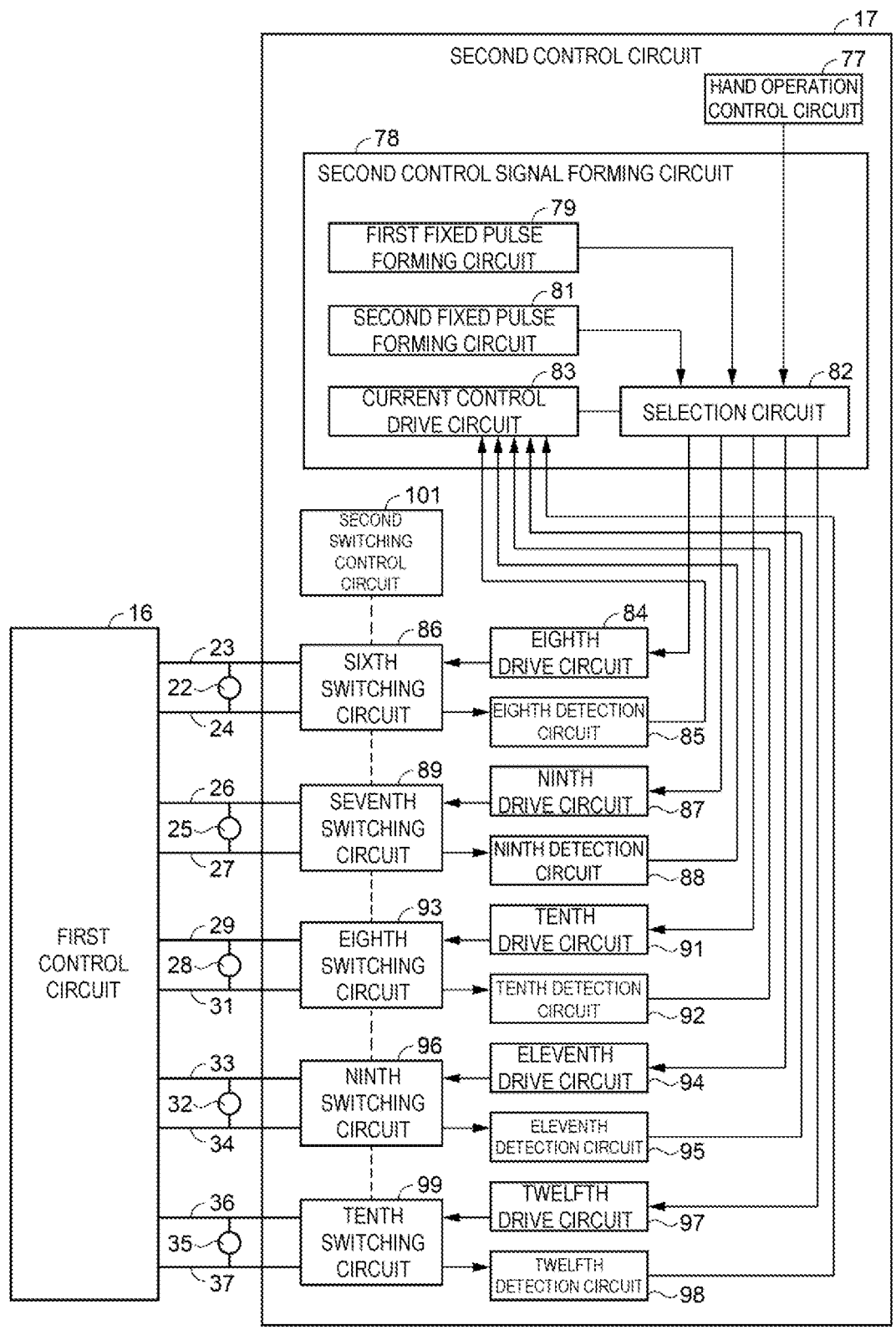
FIG. 7 is a block diagram illustrating a circuit configuration of a second control circuit.

FIG. 7 is a block diagram illustrating a circuit configuration of the second control circuit. As illustrated in FIG. 7, the second control circuit 17 is provided with a hand operation control circuit 77 and a second control signal forming circuit 78. The hand control circuit 77 and the second control signal forming circuit 78 are electrically coupled. The hand control circuit 77 outputs, to the second control signal forming circuit 78, a hand operation command signal that drives the first motor 22 to the fifth motor 35.

When the operator operates the crown 14 and the operation buttons 15 to fast forward the first hour hand 5, the first minute hand 6, the seconds hand 7, the second hour hand 9, or the second minute hand 11, the hand operation control circuit 77 outputs the hand operation command signal to the second control signal forming circuit 78. The first control circuit 16 rotates the first motor 22 to the fifth motor 35 at timings for each of the hour, the minute, and the second. The second control circuit 17 has a second pulse waveform. The second pulse waveform causes the first motor 22 to the fifth motor 35 to rotate at a time interval that is shorter than a time interval for each of the hour, the minute, and the second.

The second control signal forming circuit 78 is provided with a first fixed pulse forming circuit 79, a second fixed pulse forming circuit 81, a selection circuit 82, and a current control drive circuit 83. The first fixed pulse forming circuit 79 and the second fixed pulse forming circuit 81 are electrically coupled to the selection circuit 82. The first fixed pulse forming circuit 79 is a circuit that forms a first fixed pulse waveform and supplies the first fixed pulse waveform to the selection circuit 82. The second fixed pulse forming circuit 81 is a circuit that forms a second fixed pulse waveform and supplies the second fixed pulse waveform to the selection circuit 82.

The pulse width of the first fixed pulse waveform is longer than the pulse width of the second fixed pulse waveform. A motor having a large load is driven by the first fixed pulse waveform. A motor having a small load is driven by the second fixed pulse waveform. The current control drive circuit 83 is a circuit that determines which waveform is to be supplied to each of the motors. The current control drive circuit 83 is electrically coupled to the selection circuit 82. The current control drive circuit 83 outputs a determination result to the selection circuit 82.

The second control signal forming circuit 78 outputs a drive command signal that drives the first motor 22 to the fifth motor 35 in correspondence to the hand operation command signal output by the hand operation control circuit 77. An eighth drive circuit 84 and an eighth detection circuit 85 are electrically coupled to the second control signal forming circuit 78. A sixth switching circuit 86 is electrically coupled to the eighth drive circuit 84 and the eighth detection circuit 85. The first motor 22 is electrically coupled to the sixth switching circuit 86 via the third wiring 23 and the fourth wiring 24.

The first motor 22 is the motor that drives the first hour hand 5. The second control signal forming circuit 78 outputs, to the eighth drive circuit 84, a fast-forward signal that fast-forwards the first hour hand 5. When the second control circuit 17 drives the first motor 22, the sixth switching circuit 86 is in an on state. When the sixth switching circuit 86 to a tenth switching circuit 99 are in an on state, signals can be output to the first motor 22 to the fifth motor 35, respectively. The eighth drive circuit 84 inputs the fast-forward signal, and outputs the second motor drive signal to the first motor 22 via the sixth switching circuit 86. The first motor 22 is driven by the second motor drive signal. The eighth detection circuit 85 detects, via the sixth switching circuit 86, the current flowing in the first motor 22. The eighth detection circuit 85 detects the current flowing in the coil 46 of the first motor 22, and outputs, to the current control drive circuit 83, a current signal indicating the detection result. The current control drive circuit 83 inputs the current signal and selects the waveform to be supplied to the first motor 22.

A ninth drive circuit 87 and a ninth detection circuit 88 are electrically coupled to the second control signal forming circuit 78. A seventh switching circuit 89 is electrically coupled to the ninth drive circuit 87 and the ninth detection circuit 88. The second motor 25 is electrically coupled to the seventh switching circuit 89, via the fifth wiring 26 and the sixth wiring 27.

The second motor 25 is the motor that drives the first minute hand 6. The second control signal forming circuit 78 outputs, to the ninth drive circuit 87, a fast-forward signal that fast-forwards the first minute hand 6. When the second control circuit 17 drives the second motor 25, the seventh switching circuit 89 is in an on state. The ninth drive circuit 87 inputs the fast-forward signal, and outputs the second motor drive signal to the second motor 25 via the seventh switching circuit 89. The second motor 25 is driven by the second motor drive signal. The ninth detection circuit 88 detects, via the seventh switching circuit 89, the current flowing in the second motor 25. The ninth detection circuit 88 detects the current flowing in the coil 46 of the second motor 25, and outputs, to the current control drive circuit 83, a current signal indicating the detection result. The current control drive circuit 83 inputs the current signal and selects the waveform to be supplied to the second motor 25.

A tenth drive circuit 91 and a tenth detection circuit 92 are electrically coupled to the second control signal forming circuit 78. An eighth switching circuit 93 is electrically coupled to the tenth drive circuit 91 and the tenth detection circuit 92. The third motor 28 is electrically coupled to the eighth switching circuit 93 via the seventh wiring 29 and the eighth wiring 31.

The third motor 28 is the motor that drives the seconds hand 7. The second control signal forming circuit 78 outputs, to the tenth drive circuit 91, a fast-forward signal that fast-forwards the seconds hand 7. When the second control circuit 17 drives the third motor 28, the eighth switching circuit 93 is in an on state. The tenth drive circuit 91 inputs the fast-forward signal, and outputs the second motor drive signal to the third motor 28 via the eighth switching circuit 93. The third motor 28 is driven by the second motor drive signal. The tenth detection circuit 92 detects, via the eighth switching circuit 93, the current flowing in the third motor 28. The tenth detection circuit 92 detects the current flowing in the coil 46 of the third motor 28, and outputs, to the current control drive circuit 83, a current signal indicating the detection result. The current control drive circuit 83 inputs the current signal and selects the waveform to be supplied to the third motor 28.

The eleventh drive circuit 94 and the eleventh detection circuit 95 are electrically coupled to the second control signal forming circuit 78. A ninth switching circuit 96 is electrically coupled to the eleventh drive circuit 94 and the eleventh detection circuit 95. The fourth motor 32 is electrically coupled to the ninth switching circuit 96 via the ninth wiring 33 and the tenth wiring 34.

The fourth motor 32 is the motor that drives the second hour hand 9. The second control signal forming circuit 78 outputs, to the eleventh drive circuit 94, a fast-forward signal that fast-forwards the second hour hand 9. When the second control circuit 17 drives the fourth motor 32, the ninth switching circuit 96 is in an on state. The eleventh drive circuit 94 inputs the fast-forward signal, and outputs the second motor drive signal to the fourth motor 32 via the ninth switching circuit 96. The fourth motor 32 is driven by the second motor drive signal. The eleventh detection circuit 95 detects, via the ninth switching circuit 96, the current flowing in the fourth motor 32. The eleventh detection circuit 95 detects the current flowing in the coil 46 of the fourth motor 32, and outputs, to the current control drive circuit 83, a current signal indicating the detection result. The current control drive circuit 83 inputs the current signal and selects the waveform to be supplied to the fourth motor 32.

A twelfth drive circuit 97 and a twelfth detection circuit 98 are electrically coupled to the second control signal forming circuit 78. A tenth switching circuit 99 is electrically coupled to the twelfth drive circuit 97 and the twelfth detection circuit 98. The fifth motor 35 is electrically coupled to the tenth switching circuit 99 via the eleventh wiring 36 and the twelfth wiring 37.

The fifth motor 35 is the motor that drives the second minute hand 11. The second control signal forming circuit 78 outputs, to the twelfth drive circuit 97, a fast-forward signal that fast-forwards the second minute hand 11. When the second control circuit 17 drives the fifth motor 35, the tenth switching circuit 99 is in an on state. The twelfth drive circuit 97 inputs the fast-forward signal, and outputs the second motor drive signal to the fifth motor 35 via the tenth switching circuit 99. The fifth motor 35 is driven by the second motor drive signal. The twelfth detection circuit 98 detects, via the tenth switching circuit 99, the current flowing in the fifth motor 35. The twelfth detection circuit 98 detects the current flowing in the coil 46 of the fifth motor 35, and outputs, to the current control drive circuit 83, a current signal indicating the detection result. The current control drive circuit 83 inputs the current signal and selects the waveform to be supplied to the fifth motor 35.

The sixth switching circuit 86 to the tenth switching circuit 99 are electrically coupled to a second switching control circuit 101. When the second control circuit 17 drives the first motor 22 to the fifth motor 35, the second switching control circuit 101 switches all of the sixth switching circuit 86 to the tenth switching circuit 99 to the on state. In the first control circuit 16, the first switching control circuit 71 switches all of the first switching circuit 57 to the fifth switching circuit 70 to an off state.

When the first control circuit 16 drives the first motor 22 to the fifth motor 35, the second switching control circuit 101 switches all of the sixth switching circuit 86 to the tenth switching circuit 99 to the off state. In the first control circuit 16, the first switching control circuit 71 switches all of the first switching circuit 57 to the fifth switching circuit 70 to the on state.

When the first switching circuit 57 to the fifth switching circuit 70 are all switched to the off state, no current flows from the second control circuit 17 to the first control circuit 16. This situation is considered to be a high impedance state. Similarly, when all of the sixth switching circuit 86 to the tenth switching circuit 99 are switched to the off state, no current flows from the first control circuit 16 to the second control circuit 17. This situation is considered to be a high impedance state.

In the first motor 22, when the first control circuit 16 outputs the first motor drive signal, the second control circuit 17 is in the high impedance state to the input of the first motor drive signal. When the second control circuit 17 outputs the second motor drive signal, the first control circuit 16 is in the high impedance state to the input of the second motor drive signal. With respect to the second motor 25 to the fifth motor 35 also, the first control circuit 16 and the second control circuit 17 switch the high impedance state.

The second motor drive signal is a pulse waveform, selected from among a plurality of the pulse waveforms having the different pulse widths, at which the first motor 22 can be rotated. The rotation control method for the second motor 25 to the fifth motor 35 in the second control circuit 17 is the same rotation control as for the first motor 22. The control method for the first motor 22 will be described, and a description of the control method for the second motor 25 to the fifth motor 35 will be omitted.

Figure 8:
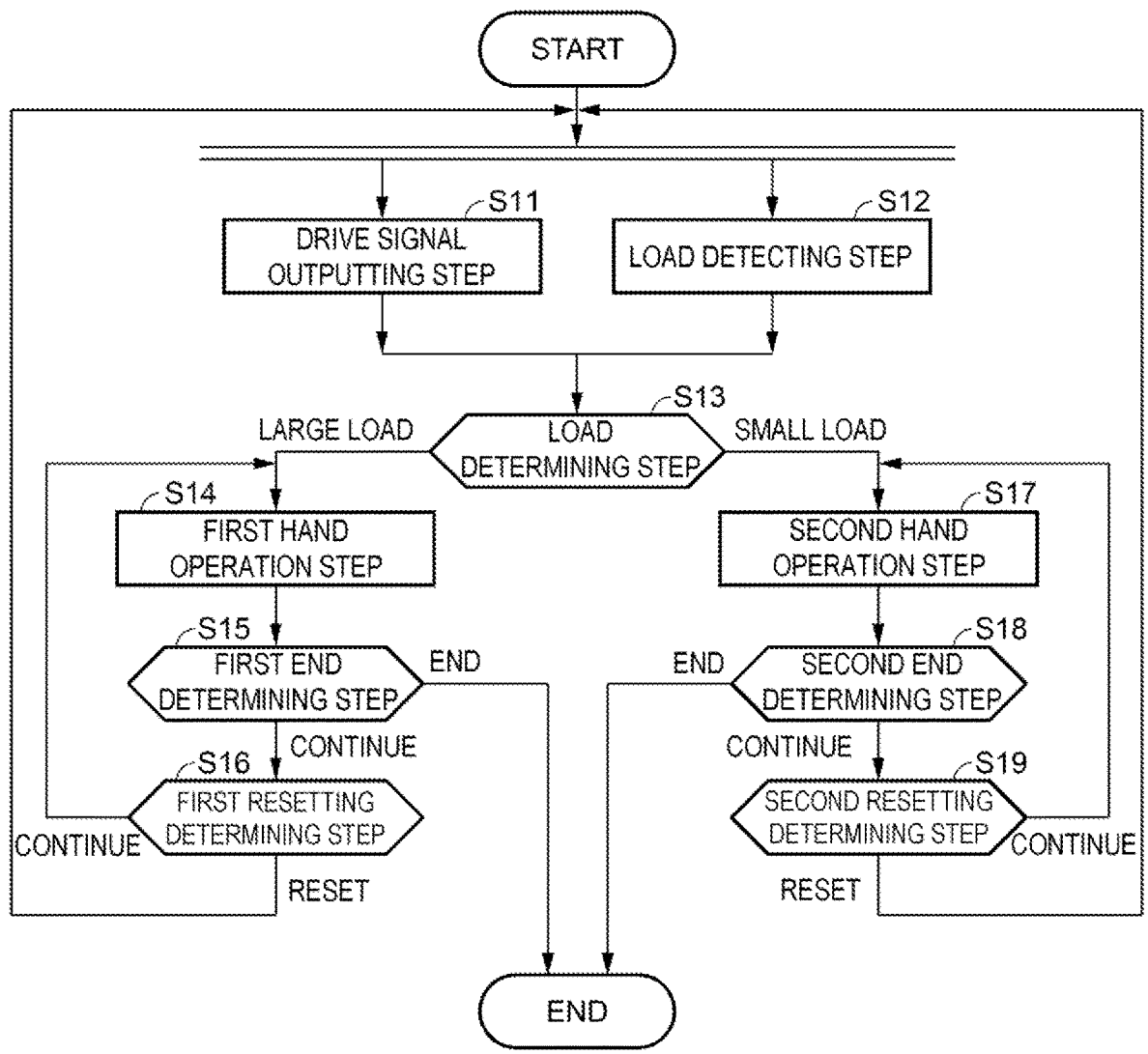
FIG. 8 is a flow diagram for describing a drive waveform control method.

FIG. 8 is a flow diagram for describing a drive waveform control method. In FIG. 8, step S11 and step S12 are performed in parallel. Step S11 is a drive signal outputting step. In this step, the selection circuit 82 outputs, to the eighth drive circuit 84, a fixed pulse waveform of either the first fixed pulse waveform or the second fixed pulse waveforms. The eighth drive circuit 84 outputs the second motor drive signal having the same pulse width as the fixed pulse waveform to the first motor 22 and drives the first motor 22. Next, the processing proceeds to step S13.

Step S12 is a load detecting step. This step is a step at which the current control drive circuit 83 detects the load of the first motor 22. The current control drive circuit 83 detects the load of the first motor 22 on the basis of a transition in the amount of current flowing in the first motor 22. Next, the processing proceeds to step S13. Step S13 is a load determining step. The current control drive circuit 83 determines the load. When the load of the first motor 22 is large, the processing proceeds to step S14. When the load of the first motor 22 is small, the processing proceeds to step S17.

Step S14 is a first hand operation step. At this step, the hand operation control circuit 77 transmits a drive command signal instructing the driving of the first motor 22, and the selection circuit 82 inputs the drive instruction signal. The selection circuit 82 selects the first fixed pulse waveform. The selection circuit 82 transmits the first fixed pulse waveform to the eighth drive circuit 84. The eighth drive circuit 84 causes the pulse width of the second motor drive signal to be the pulse width of the first fixed pulse waveform.

The eighth drive circuit 84 outputs the second motor drive signal to the first motor 22 and drives the first motor 22. The first hour hand 5 is fast-forwarded by the first motor 22. The first hour hand 5 moves toward a location to which it is planned to be moved. Next, the processing proceeds to step S15.

Step S15 is an end determining step. This step is a step at which it is determined whether to end or continue the driving of the wristwatch 1. When ending the driving of the wristwatch 1, ending the driving is determined, and the step of driving the first motor 22 is ended. When continuing the driving of the wristwatch 1, the processing next proceeds to step S16.

Step S16 is a first resetting determining step. This step is a step at which it is determined whether or not to reset the fixed pulse waveform. The selection circuit 82 compares a driving time of the first motor 22 with a determination time. When the driving time of the first motor 22 does not exceed the determination time, a determination is made to continue to use the first fixed pulse waveform. Next, the processing proceeds to step S14. When the driving time of the first motor 22 exceeds the determination time, a determination is made to reset the fixed pulse waveform. Next, the processing proceeds to step S11 and step 12.

Step S11 is a second hand operation step. At this step, the hand operation control circuit 77 transmits the drive command signal instructing the driving of the first motor 22, and the selection circuit 82 inputs the drive instruction signal. The selection circuit 82 selects the second fixed pulse waveform. The selection circuit 82 transmits the second fixed pulse waveform to the eighth drive circuit 84. The eighth drive circuit 84 causes the pulse width of the second motor drive signal to be the pulse width of the second fixed pulse waveform.

The eighth drive circuit 84 outputs the second motor drive signal to the first motor 22 and drives the first motor 22. The first hour hand 5 is fast-forwarded by the first motor 22. The first hour hand 5 moves toward a location to which it is planned to be moved. Next, the processing proceeds to step S18.

Step S18 is a second end determining step. This step is a step at which it is determined whether to end or continue the driving of the wristwatch 1. When ending the driving of the wristwatch 1, ending the driving is determined, and the step of driving the first motor 22 is ended. When continuing the driving of the wristwatch 1, the processing proceeds to step S19.

Step S19 is a second resetting determining step. This step is a step in which it is determined whether or not to reset the fixed pulse waveform. The selection circuit 82 compares the driving time of the first motor 22 with a determination time. When the driving time of the first motor 22 does not exceed the determination time, a determination is made to continue to use the second fixed pulse waveform. Next, the processing proceeds to step S17. When the driving time of the first motor 22 exceeds the determination time, a determination is made to reset the fixed pulse waveform. Next, the processing returns to step S11 and step S12.

The second pulse waveform output by the second control circuit 17 to the first motor 22 causes the first motor 22 to rotate at a time interval shorter than one hour. The second pulse waveform includes a signal that fast-forwards the hour hand. The second pulse waveform is the pulse waveform selected from among two of the pulse waveforms having the different pulse widths, at which the motor can be rotated. The first motor 22 is driven efficiently as it rotates with low power consumption. The second control circuit 17 that outputs the second motor drive signal is more likely to be modified. Therefore, when the circuit that outputs the second motor drive signal is modified, the second control circuit is modified without modifying the first control circuit, and the modification can thus be efficiently performed.

Figure 9:
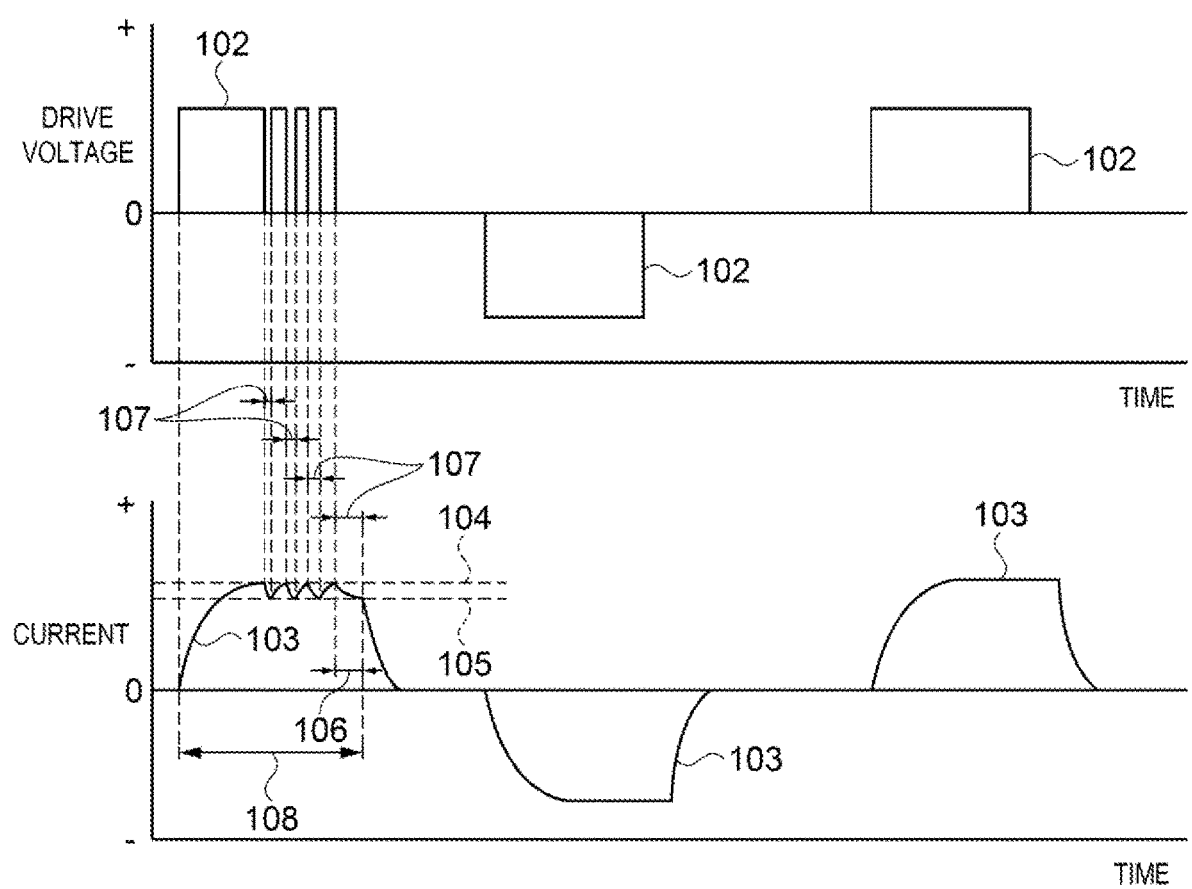
FIG. 9 is a time chart for describing the rotation detection of the motor.

FIG. 9 is a time chart for describing the rotation detection of the motor. Two time charts are illustrated in FIG. 9. The horizontal axis indicates a transition in time, with time transitioning from left to right in the drawing. The upper vertical axis indicates the drive voltage and a center thereof in the drawing is 0 V. The upper side of the vertical axis indicates a positive voltage and the lower side indicates a negative voltage. A second motor drive waveform 102 that is the second pulse waveform indicates the waveform of the second motor drive signal that the eighth drive circuit 84 outputs to the first motor 22. The lower vertical axis indicates a current, and a direction of current flow is reversed between above and below the horizontal axis. A second current waveform 103 illustrates the waveform of the current flowing in the coil 46 in correspondence to the second motor drive waveform 102.

At step S11, the second motor drive signal of the second motor drive waveform 102 is applied to the coil 46. At this step, the second motor drive waveform 102 is controlled by the current control drive circuit 83. When the second motor drive waveform 102 rises up, the second current waveform 103 rises.

At step S12, the eighth detection circuit 85 detects the current flowing in the coil 46 and outputs the detected current value to the current control drive circuit 83. The current control drive circuit 83 stores an upper limit determination value 104, a lower limit determination value 105, and a time determination value 106. The current control drive circuit 83 lowers the second motor drive waveform 102 to 0 V when the second current waveform 103 reaches the upper limit determination value 104. The current control drive circuit 83 measures an elapsed time 107, which is a time period for the second current waveform 103 to be reduced and reach the lower limit determination value 105. When the second current waveform 103 reaches the lower limit determination value 105, the current control drive circuit 83 compares the elapsed time 107 to the time determination value 106.

When the elapsed time 107 is shorter than the time determination 106, the current control drive circuit 83 raises the second motor drive waveform 102. The current control drive circuit 83 repeats the raising and lowering of the second motor drive waveform 102. The elapsed time 107 increases in response to an increase in the rotation angle of the rotor 49. When the rotor 49 is rotated by a half-rotation, the elapsed time 107 becomes longer than the time determination value 106. When the elapsed time 107 is longer than the time determination value 106, the sixth switching circuit 86 changes the polarity of the current flowing in the coil 46. This causes the second current waveform 103 to drop sharply.

The current control drive circuit 83 measures a driving time 108, which is a time period from the rising to the sharp drop of the second current waveform 103 At step S13, the current control drive circuit 83 compares the driving time 108 to a load determination time. When the driving time 108 is longer than the load determination time, the load of the first motor 22 is determined to be large. When the driving time 108 is less than the load determination time, the load of the first motor 22 is determined to be small. Note that the load is measured by the same method in the second motor 25 to the fifth motor 35. Then, the waveform for driving each of the motors is set.

Figure 10:
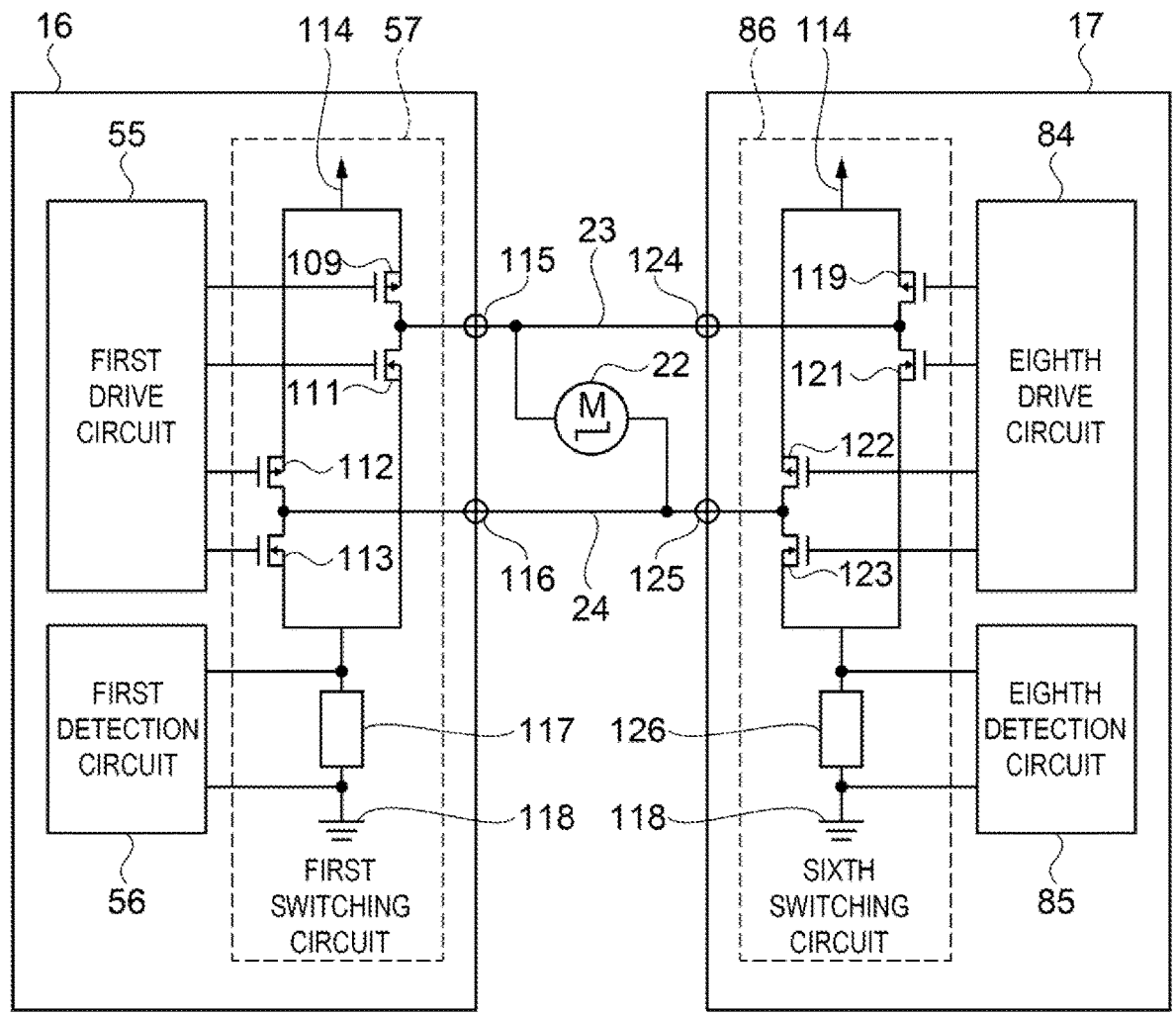
FIG. 10 is a circuit diagram illustrating a configuration of switching circuits.

FIG. 10 is a circuit diagram illustrating a configuration of the switching circuits. Each of the first switching circuit 57 to the fifth switching circuit 70 has the same configuration. A configuration of the first switching circuit 57 will be described, and a description of the second switching circuit 61 to the fifth switching circuit 70 will be omitted. Similarly, each of the sixth switching circuit 86 to the tenth switching circuit 99 has the same configuration. A configuration of the sixth switching circuit 86 will be described, and a description of the seventh switching circuit 89 to the tenth switching circuit 99 will be omitted.

As illustrated in FIG. 10, in the first switching circuit 57, a first switch 109 and a second switch 111 are coupled in series. A third switch 112 and a fourth switch 113 are coupled in series. A set configured by the first switch 109 and the second switch 111 is coupled in parallel with a set configured by the third switch 112 and the fourth switch 113.

Each of the first switch 109 and the third switch 112 is a P-channel metal-oxide-semiconductor field-effect transistor (MOSFET). Each of the second switch 111 and the fourth switch 113 is an N-channel MOSFET.

The gates of the first switch 109 to the fourth switch 113 are electrically coupled to the first drive circuit 55. The sources of the first switch 109 to the third switch 112 are electrically coupled to a power terminal 114. The drain of the first switch 109, the drain of the second switch 111, and a first terminal 115 are electrically coupled. The third wiring 23 is electrically coupled to the first terminal 115. The drain of the third switch 112, the drain of the fourth switch 113, and a second terminal 116 are electrically coupled. The fourth wiring 24 is electrically coupled to the second terminal 116.

The source of the second switch 111, the source of the fourth switch 113, and one end of a first resistor 117 are electrically coupled. The other end of the first resistor 117 is electrically coupled to a ground terminal 118. Both ends of the first resistor 117 are electrically coupled to the first detection circuit 56. The current flowing in the first resistor 117 is converted to a voltage by the first resistor 117. The first detection circuit 56 detects the voltage at both the ends of the first resistor 117.

In the sixth switching circuit 86, a fifth switch 119 and a sixth switch 121 are coupled in series. A seventh switch 122 and an eighth switch 123 are coupled in series. A set configured by the fifth switch 119 and the sixth switch 121 is coupled in parallel with a set configured by the seventh switch 122 and the eighth switch 123.

Each of the fifth switch 119 and the seventh switch 122 is a P-channel MOSFET. Each of the sixth switch 121 and the eighth switch 123 is an N-channel MOSFET.

The gates of the fifth switch 119 to the eighth switch 123 are electrically coupled to the eighth drive circuit 84. The sources of the fifth switch 119 and the seventh switch 122 are electrically coupled to the power terminal 114. The drain of the fifth switch 119, the drain of the sixth switch 121, and a third terminal 124 are electrically coupled. The third wiring 23 is electrically coupled to the third terminal 124. The drain of the seventh switch 122, the drain of the eighth switch 123, and a fourth terminal 125 are electrically coupled. The fourth wiring 24 is electrically coupled to the fourth terminal 125.

The source of the sixth switch 121, the source of the eighth switch 123, and one end of a second resistor 126 are electrically coupled. The other end of the second resistor 126 is electrically coupled to the ground terminal 118. Both ends of the second resistor 126 are electrically coupled to the eighth detection circuit 85. The current flowing in the second resistor 126 is converted to a voltage by the second resistor 126. The eighth detection circuit 85 detects the voltage at both the ends of the second resistor 126.

Figure 11:
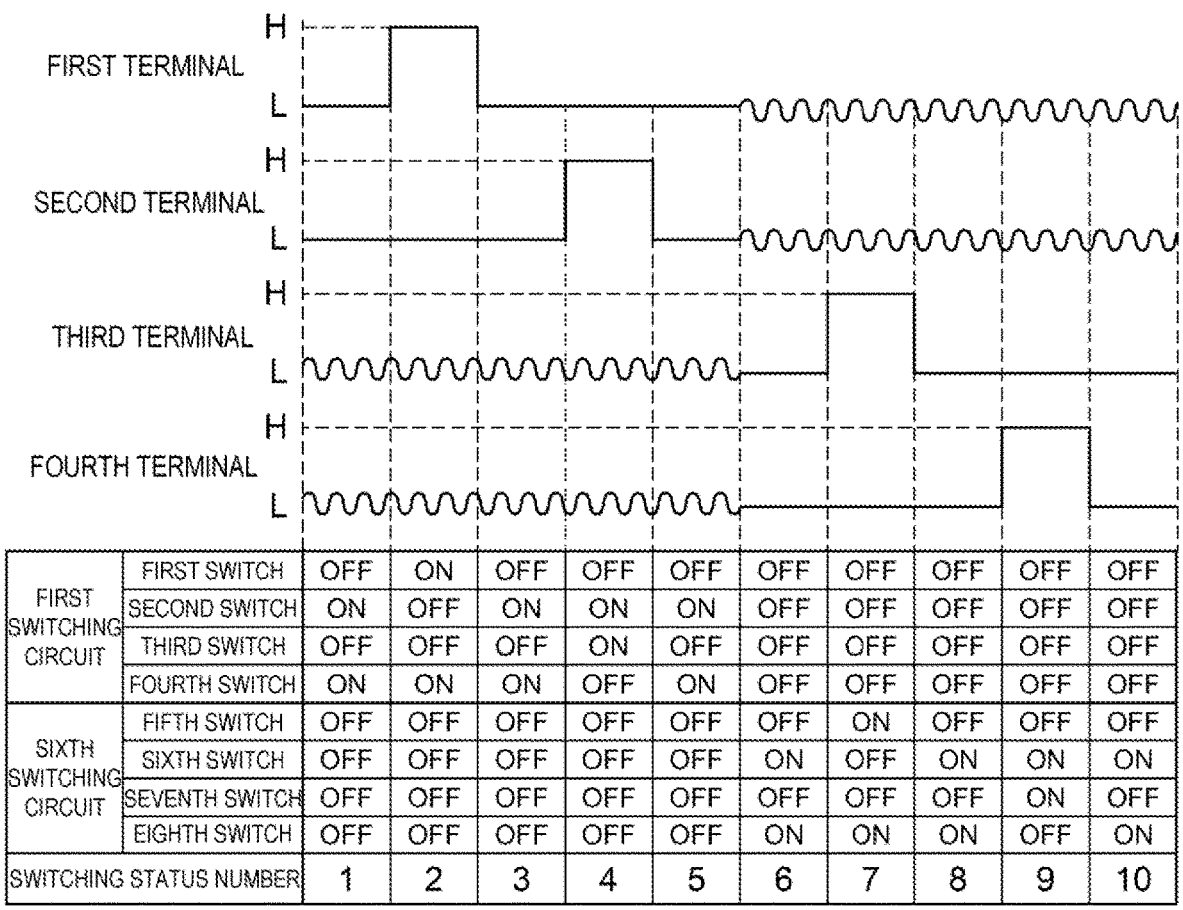
FIG. 11 is a diagram illustrating states of switches and a voltage of each of terminals.

FIG. 11 is a diagram illustrating states of the switches and a voltage of each of the terminals. Four rows on the upper side of FIG. 11 are time charts indicating the states of the first terminal 115 to the fourth terminal 125. The vertical axis indicates the voltage. "H" on the vertical axis indicates a high level voltage. The high level voltage is a voltage close to a voltage of the power terminal 114. "L" on the vertical axis indicates a low level voltage. The low level voltage is a voltage close to a voltage of the ground terminal 118.

The lower side of FIG. 11 is a table showing the states of the switches. "ON" in the table indicates that the switch is in an on state. "OFF" in the table indicates that the switch is in an off state. When any two of the first switch 109 to the fourth switch 113 are in the on state, the first switching circuit 57 is in the on state. When any two of the fifth switch 119 to the eighth switch 123 are in the on state, the sixth switching circuit 86 is in the on state.

A switch state number from 1 to 10 is assigned in order from the left end of the table. When the switch state number is from No. 1 to No. 5, the sixth switching circuit 86 is in the off state. At this time, the third terminal 124 and the fourth terminal 125 are in the high impedance state in which no current enters the second control circuit 17. Wave lines illustrating charts of the third terminal 124 and the fourth terminal 125 on the upper side of FIG. 11 indicate the high impedance state. In this way, the second control circuit 17 is in the high impedance state to the input of the first motor drive signal.

When the switch state number is No. 1, the second switch 111 and the fourth switch 113 are in the on state, and the first switch 109 and the third switch 112 are in the off state. At this time, the first terminal 115 and the second terminal 116 are at the L level. No current flows through the first motor 22.

When the switch state number is No. 2, the first switch 109 and the fourth switch 113 are in the on state, and the second switch 111 and the third switch 112 are in the off state. At this time, the first terminal 115 is at the H level and the second terminal 116 is at the L level. At this time, the current flows in the first motor 22 from the first terminal 115 to the second terminal 116.

When the switch state number is No. 3, the first switch 109 to the fourth switch 113 are the same as when the switch state number is No. 1, and the first terminal 115 and the second terminal 116 are at the L level. At this time, no current flows through the first motor 22.

When the switch state number is No. 4, the second switch 111 and the third switch 112 are in the on state and the first switch 109 and the fourth switch 113 are in the off state. At this time, the first terminal 115 is at the L level and the second terminal 116 is at the H level. At this time, the current flows in the first motor 22 from the second terminal 116 to the first terminal 115.

When the switch state number is No. 5, the first switch 109 to the fourth switch 113 are the same as when the switch state number is No. 1, and the first terminal 115 and the second terminal 116 are at the L level. At this time, no current flows through the first motor 22. As a result of repeating the states of the switch state numbers from No. 1 to No. 4, a pulse waveform in which the voltage is inverted is applied to the first motor 22. The first control circuit 16 outputs the first motor drive signal of the pulse waveform to the first motor 22, and rotates the first motor 22.

When the switch state number is from No. 6 to No. 10, the first switching circuit 57 is in the off state. At this time, the first terminal 115 and the second terminal 116 are in the high impedance state in which no current enters the first control circuit 16. Wave lines illustrating charts of the first terminal 115 and the second terminal 116 on the upper side of FIG. 11 indicate the high impedance state. The first control circuit 16 stops the output of the first motor drive signal. The first control circuit 16 is in the high impedance state to the input of the second motor drive signal.

When the switch state number is No. 6, the sixth switch 121 and the eighth switch 123 are in the on state and the fifth switch 119 and the seventh switch 122 are in the off state. At this time, the third terminal 124 and the fourth terminal 125 are at the L level. At this time, no current flows through the first motor 22.

When the switch state number is No. 7, the fifth switch 119 and the eighth switch 123 are in the on state and the sixth switch 121 and the seventh switch 122 are in the off state. At this time, the third terminal 124 is at the H level, and the fourth terminal 125 is at the L level. At this time, the current flows in the first motor 22 from the third terminal 124 to the fourth terminal 125.

When the switch state number is No. 8, the fifth switch 119 to the eighth switch 123 are the same as when the switch state number is No. 6, and the third terminal 124 and the fourth terminal 125 are at the L level. At this time, no current flows through the first motor 22.

When the switch state number is No. 9, the sixth switch 121 and the seventh switch 122 are in the on state, and the fifth switch 119 and the eighth switch 123 are in the off state. At this time, the third terminal 124 is at the L level, and the fourth terminal 125 is at the H level. At this time, the current flows in the first motor 22 from the fourth terminal 125 to the third terminal 124.

When the switch state number is No. 10, the fifth switch 119 to the eighth switch 123 are the same as when the switch state number is No. 6, and the third terminal 124 and the fourth terminal 125 are at the L level. At this time, no current flows through the first motor 22. As a result of repeating the states of the switch state numbers from No. 6 to No. 9, a pulse waveform in which the voltage is inverted is applied to the first motor 22. The second control circuit 17 outputs the second motor drive signal of the pulse waveform to the first motor 22, and rotates the first motor 22.

When the number of control circuits is one, the scale of the circuit increases, and labor required for modification is greater. When the control circuit is configured by two circuits, the scale of each of the circuits can be reduced. When the scale of the circuit is small, the labor required for the modification is small. In the method for performing the above-described the control using the configuration of the wristwatch 1, a function for normal hand operation for which the possibility of modification is small is built into the first control circuit 16. The fast-forward function for which the possibility of modification is large is built into the second control circuit 17. In this way, when the control circuit is modified, the possibility is increased of limiting the modification to the second control circuit 17. Thus, the control circuit can be modified in an efficient manner.

The plurality of motors are electrically coupled to the first control circuit 16 and the second control circuit 17. Of the functions to drive the plurality of motors, the functions for which the possibility of modification is small are built into the first control circuit 16. Of the functions to drive the plurality of motors, the functions for which the possibility of modification is large are built into the second control circuit 17. Thus, also in the circuit that controls the plurality of motors, the control circuit can be modified in an efficient manner.

Second Embodiment

The present embodiment differs from the first embodiment in that the control circuit and a test device drive the motor. Note that a description is omitted of points identical to those of the first embodiment.

Figure 12:
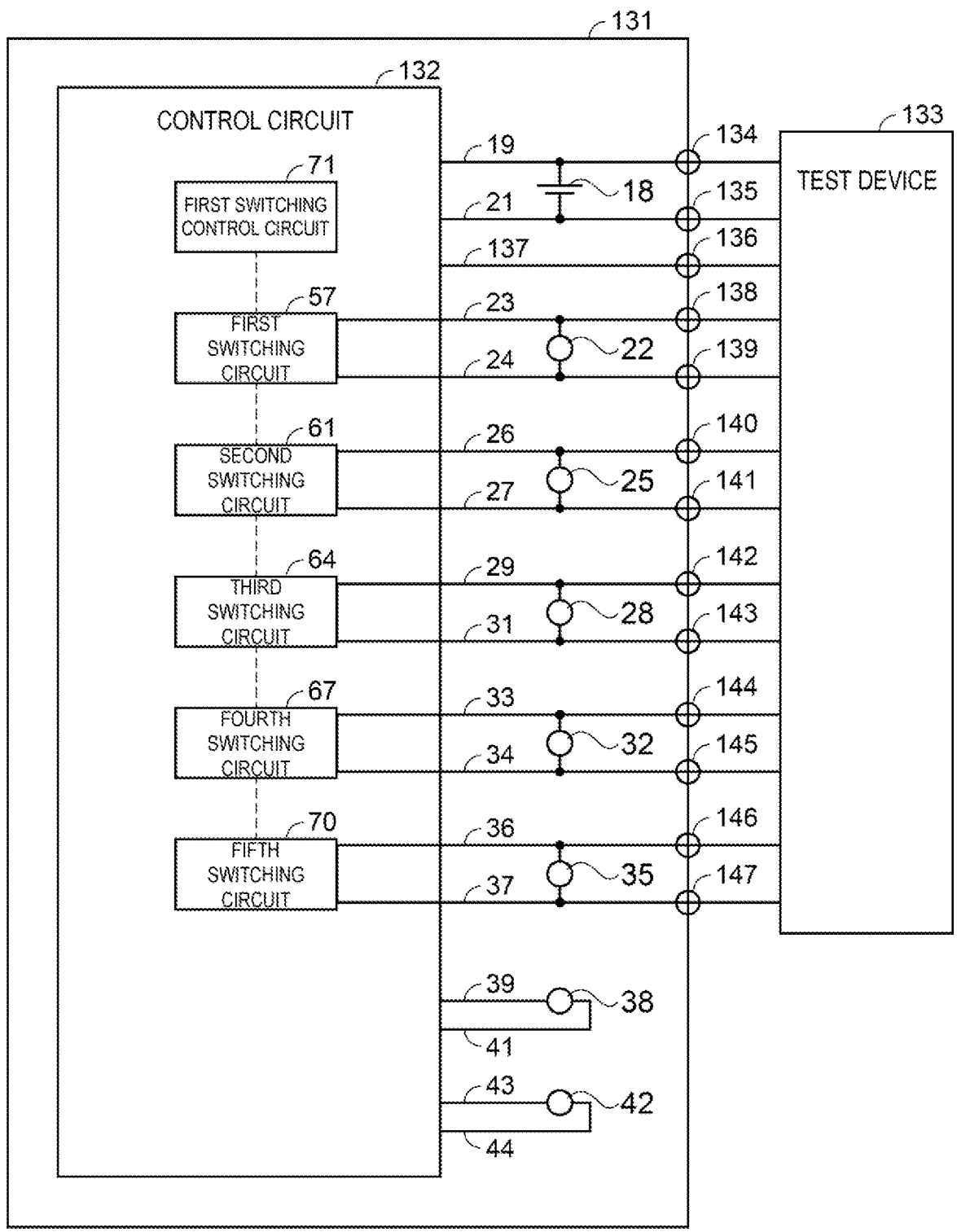
FIG. 12 is a block diagram illustrating a circuit configuration of an electronic watch and a test device according to a second embodiment.

FIG. 12 is a block diagram illustrating a circuit configuration of an electronic watch and the test device. As illustrated in FIG. 12, a wristwatch 131 that is an electronic watch is provided with a control circuit 132. The wristwatch 131 is provided with a plurality of inspection terminals. The inspection terminals are electrically coupled to the control circuit 132. When testing the motor, a probe of a test device 133 is brought into contact with the inspection terminal and is electrically coupled thereto.

The wristwatch 131 is provided with the battery 18. The anode of the battery 18 is electrically coupled to a first power supply terminal 134 by the first wiring 19. The cathode of the battery 18 is electrically coupled to a second power supply terminal 135 by the second wiring 21.

The wristwatch 131 is provided with a test control terminal 136, which is electrically coupled to the control circuit 132 by fifteenth wiring 137. The test control terminal 136 is electrically coupled to the test device 133 via the probe. When the test device 133 tests the motor, the test device 133 transmits a test start signal to the control circuit 132 via the test control terminal 136. When the test device 133 ends the testing of the motor, the test device 133 transmits a test end signal to the control circuit 132 via the test control terminal 136.

The wristwatch 131 is provided with the first motor 22 that drives the first hour hand 5. The first motor 22 is electrically coupled to the control circuit 132 by the third wiring 23 and the fourth wiring 24. The control circuit 132 outputs the first motor drive signal to the first motor 22 to drive the first motor 22. The first motor 22 is electrically coupled, via the third wiring 23, to a first inspection terminal 138 that is one of the inspection terminals. Furthermore, the first motor 22 is electrically coupled, via the fourth wiring 24, to a second inspection terminal 139 that is one of the inspection terminals.

The test device 133 outputs the second motor drive signal to the first motor 22 to drive the first motor 22. At this time, the second motor drive signal is input into the first inspection terminal 138 and the second inspection terminal 139. The third wiring 23 and the fourth wiring 24 are electrically coupled to the first switching circuit 57. Note that the first motor drive signal is the drive signal output from the control circuit 132, and the second motor drive signal is the drive signal output from the test device 133.

The wristwatch 131 is provided with the second motor 25 that drives the first minute hand 6. The second motor 25 is electrically coupled to the control circuit 132 by the fifth wiring 26 and the sixth wiring 27. The control circuit 132 outputs the first motor drive signal to the second motor 25 to drive the second motor 25. The second motor 25 is electrically coupled, via the fifth wiring 26, to a third inspection terminal 140 that is one of the inspection terminals. Furthermore, the second motor 25 is electrically coupled, via the sixth wiring 27, to a fourth inspection terminal 141 that is one of the inspection terminals.

The test device 133 outputs the second motor drive signal to the second motor 25 to drive the second motor 25. At this time, the second motor drive signal is input to the third inspection terminal 140 and the fourth inspection terminal 141. The fifth wiring 26 and the sixth wiring 27 are electrically coupled to the second switching circuit 61.

The wristwatch 131 is provided with the third motor 28 that drives the seconds hand 7. The third motor 28 is electrically coupled to the control circuit 132 by the seventh wiring 29 and the eighth wiring 31. The control circuit 132 outputs the first motor drive signal to the third motor 28 to drive the third motor 28. The third motor 28 is electrically coupled, via the seventh wiring 29, to a fifth inspection terminal 142 that is one of the inspection terminals. Furthermore, the third motor 28 is electrically coupled, via the eighth wiring 31, to a sixth inspection terminal 143 that is one of the inspection terminals.

The test device 133 outputs the second motor drive signal to the third motor 28 to drive the third motor 28. At this time, the second motor drive signal is input to the fifth inspection terminal 142 and the sixth inspection terminal 143. The seventh wiring 29 and the eighth wiring 31 are electrically coupled to the third switching circuit 64.

The wristwatch 131 is provided with the fourth motor 32 that drives the second hour hand 9. The fourth motor 32 is electrically coupled to the control circuit 132 by the ninth wiring 33 and the tenth wiring 34. The control circuit 132 outputs the first motor drive signal to the fourth motor 32 to drive the fourth motor 32. The fourth motor 32 is electrically coupled, via the ninth wiring 33, to a seventh inspection terminal 144 that is one of the inspection terminals. Furthermore, the fourth motor 32 is electrically coupled, via the tenth wiring 34, to an eighth inspection terminal 145 that is one of the inspection terminals.

The test device 133 outputs the second motor drive signal to the fourth motor 32 to drive the fourth motor 32. At this time, the second motor drive signal is input to the seventh inspection terminal 144 and the eighth inspection terminal 145. The seventh inspection terminal 144 and the eighth inspection terminal 145 are electrically coupled to the fourth switching circuit 67.

The wristwatch 131 is provided with the fifth motor 35 that drives the second minute hand 11. The fifth motor 35 is electrically coupled to the control circuit 132 by the eleventh wiring 36 and the twelfth wiring 37. The control circuit 132 outputs the first motor drive signal to the fifth motor 35 to drive the fifth motor 35. The fifth motor 35 is electrically coupled, via the eleventh wiring 36, to a ninth inspection terminal 146 that is one of the inspection terminals. Furthermore, the fifth motor 35 is electrically coupled, via the twelfth wiring 37, to a tenth inspection terminal 147 that is one of the inspection terminals.

The test device 133 outputs the second motor drive signal to the fifth motor 35 to drive the fifth motor 35. At this time, the second motor drive signal is input to the ninth inspection terminal 146 and the tenth inspection terminal 147. The ninth inspection terminal 146 and the tenth inspection terminal 147 are electrically coupled to the fifth switching circuit 70.

When the test start signal is input from the test control terminal 136 to the control circuit 132, the first switching control circuit 71 causes the first switching circuit 57 to the fifth switching circuit 70 to be in the high impedance state. In this way, when the second motor drive signal is input to the first inspection terminal 138 and the second inspection terminal 139, the control circuit 132 is in the high impedance state to the input of the second motor drive signal. The second motor drive signal is input to the first motor 22 and is not input to the control circuit 132.

Similarly, when the second motor drive signal is input to the third inspection terminal 140 to the tenth inspection terminal 147, the control circuit 132 is in the high impedance state to the input of the second motor drive signal. The second motor drive signal is input to the second motor 25 to the fifth motor 35 and is not input to the control circuit 132.

The test device 133 tests the characteristics of the first motor 22 by changing the waveform shape and frequency of the signal waveform of the second motor drive signal. At this time, since the current flows to the first motor 22 and does not flow to the control circuit 132, it is possible to accurately test the characteristics of the first motor 22.

Similarly, the test device 133 tests the characteristics of the second motor 25 to the fifth motor 35 by changing the waveform shape and frequency of the signal waveform of the second motor drive signal. At this time, since the current flows to the second motor 25 to the fifth motor 35 and does not flow to the control circuit 132, it is possible to accurately test the characteristics of the second motor 25 to the fifth motor 35.

Figure 13:
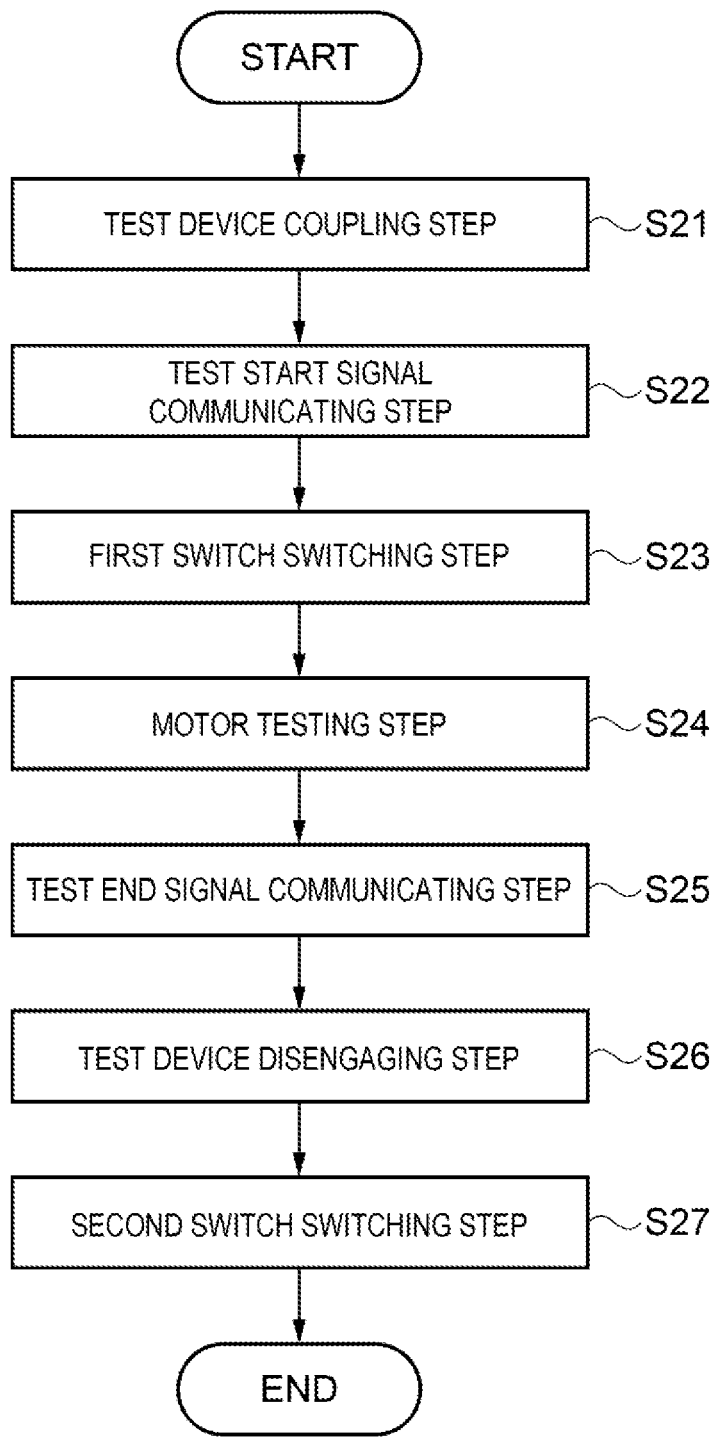
FIG. 13 is a flowchart for describing a motor inspection method.

FIG. 13 is a flow chart for describing a test method for the motor. In FIG. 13, step S21 is a test device coupling step. At this step, the probe of the test device 133 is brought into contact with the first power supply terminal 134 to the tenth inspection terminal 147 in order to electrically couple the test device 133 and the wristwatch 131.

Step S22 is a test start signal communicating step. At this step, the test device 133 transmits the test start signal to the control circuit 132 via the test control terminal 136 and the fifteenth wiring 137. The control circuit 132 receives the test start signal.

Step S23 is a first switch switching step. At this step, the first switching control circuit 71 causes the first switching circuit 57 to the fifth switching circuit 70 to be in the high impedance state. The control circuit 132 is in the high impedance state to the input of the second motor drive signal that drives the first motor 22 to the fifth motor 35. Next, the control circuit 132 outputs a test ready signal to the test device 133, via the fifteenth wiring 137 and the test control terminal 136. Next, the processing proceeds to step S24.

Step S24 is a motor testing step. At this step, the second motor drive signal input from the first inspection terminal 138 and the second inspection terminal 139 drives the first motor 22. The test device 133 switches the voltage and frequency applied to the first motor 22 and measures the current flowing in the first motor 22. The test device 133 measures the characteristics of the first motor 22. In a similar manner, the test device 133 measures the characteristics of the second motor 25 to the fifth motor 35. Next, the processing proceeds to step S25.

Step S25 is a test end signal communicating step. At this step, the test device 133 transmits a test termination signal to the control circuit 132, via the test control terminal 136 and the fifteenth wiring 137. The control circuit 132 receives the test end signal.

Step S26 is a test device disengaging step. At this step, the probe of the test device 133 is separated from the first power supply terminal 134 to the tenth inspection terminal 147, in order to electrically disconnect the test device 133 and the wristwatch 131.

Step S27 is a second switch switching step. At this step, the first switching control circuit 71 causes the first switching circuit 57 to the fifth switching circuit 70 to be in a state of being able to perform transmission. The control circuit 132 is in a state of being able to output the first motor drive signal that drives the first motor 22 to the fifth motor 35. By the steps described above, the steps of measuring the characteristics of the motor are ended.

According to the test method for the wristwatch 131, the test device 133 can test the characteristics of the first motor 22 by changing the waveform shape and frequency of the signal waveform of the second motor drive signal. At this time, since the current flowing in the first motor 22 does not flow to the control circuit 132, it is possible to accurately test the characteristics of the first motor 22.

First Modified Example

In the first embodiment, the wristwatch 1 is provide with the first control circuit 16 and the second control circuit 17. The number of control circuits is not limited to two. There may be three or more control circuits.

Second Modified Example

In the first embodiment, the first motor 22 to the seventh motor 42 are stepping motors. The type of motor is not limited to the stepping motor. The motor may be a direct current motor or an alternating current motor.

Third Modified Example

The first control circuit 16 selects the first motor drive signal having the waveform with the short pulse width, among the pulse widths at which the motor can be rotated. The first control circuit 16 may be set to the first motor drive signal having the waveform for which the pulse width does not change. The first control circuit 16 can be a simple circuit.

Contents derived from the embodiments will be described below.

An electronic watch includes a motor configured to drive a pointer, a first control circuit electrically coupled to the motor and configured to output a first motor drive signal, and a second control circuit electrically coupled to the motor and configured to output a second motor drive signal. When the first control circuit outputs the first motor drive signal, the second control circuit is in a high impedance state to the input of the first motor drive signal, and when the second control circuit outputs the second motor drive signal, the first control circuit is in a high impedance state to the input of the second motor drive signal.

According to this configuration, the first control circuit and the second control circuit are electrically coupled to the motor that drives the pointer. When the first control circuit outputs the first motor drive signal to the motor, the second control circuit is in the high impedance state to the input of the first motor drive signal. The high impedance state indicates a state in which there is no current flow. Thus, even if the current flows to the motor as a result of the first motor drive signal, no current flows to the second control circuit.

When the second control circuit outputs the second motor drive signal to the motor, the first control circuit is in the high impedance state to the input of the second motor drive signal. Thus, even if the current from the second motor drive signal flows to the motor, no current flows to the first control circuit. The first control circuit and the second control circuit control the motor. Note that the first control circuit and the second control circuit are formed on different circuit elements, respectively.

When the number of control circuits is one, the scale of the circuit increases, and labor required for modification is greater. When the control circuit is configured by two circuits, the scale of each of the circuits can be reduced. When the scale of the circuit is small, the labor required for the modification is small. The function for which the possibility of modification is small is built into the first control circuit, and the function for which the possibility of modification is large is built into the second control circuit. In this way, when the control circuit is modified, the possibility is increased of limiting the modification to the second control circuit. Thus, the control circuit can be modified in an efficient manner.

In the above-described electronic watch, the first motor drive signal may have a first pulse waveform that rotates the motor, the first pulse waveform being output at a predetermined interval to rotate the motor, and the second motor drive signal may have a second pulse waveform that rotates the motor and is selected from among a plurality of pulse waveforms having different pulse widths, the second pulse waveform being output at a time interval shorter than the predetermined time interval to rotate the motor.

According to this configuration, the first pulse waveform of the first motor drive signal output by the first control circuit rotates the pointer at the predetermined time interval. The predetermined time interval is one hour when the pointer is an hour hand. The predetermined time interval is one minute when the pointer is a minute hand. The predetermined time interval is one second when the pointer is a seconds hand. The first motor drive signal is the pulse waveform adjusted to a short pulse width within a range of pulse widths at which the motor can be rotated. The first control circuit that outputs the first motor drive signal is less likely to be modified.

The second pulse waveform of the second motor drive signal output by the second control circuit rotates the motor at the time interval that is shorter than the predetermined time interval. The second motor drive signal includes signals that fast-forward the hour hand, the minute hand, and the seconds hand. The second pulse waveform is the pulse waveform selected from among the plurality of pulse waveforms having the different pulse widths, within the range of pulse widths at which the motor can be rotated. The second control circuit that outputs the second pulse waveform of the second motor drive signal is likely to be modified. Therefore, when the circuit that outputs the second motor drive signal is modified, the second control circuit is modified without modifying the first control circuit, and the modification can thus be efficiently performed.

In the above-described electronic watch, a plurality of the motors may be electrically coupled to the first control circuit and the second control circuit.

According to this configuration, the plurality of motors are electrically coupled to the first control circuit and the second control circuit. Of the functions to drive the plurality of motors, the function for which the possibility of modification is small is built into the first control circuit. Of the functions to drive the plurality of motors, the function for which the possibility of modification is large is built into the second control circuit. Thus, also in the circuit that controls the plurality of motors, the control circuit can be modified in an efficient manner.

A control method is a control method for an electronic watch including a motor that drives a pointer, a first control circuit electrically coupled to the motor and outputting a first motor drive signal, and a second control circuit electrically coupled to the motor and outputting a second motor drive signal. The control method includes setting the second control circuit to a high impedance state to input of the first motor drive signal, causing the first control circuit to output the first motor drive signal to the motor, stopping the first control circuit from outputting the first motor drive signal, setting the first control circuit to a high impedance state to input of the second motor drive signal, and causing the second control circuit to output the second motor drive signal to the motor.

According to the control method for the electronic watch, the electronic watch includes the first control circuit that outputs the first motor drive signal to the motor and the second control circuit that outputs the second motor drive signal to the motor. The second control circuit is in the high impedance state to the input of the first motor drive signal. The first control circuit then outputs the first motor drive signal to the motor. The current flows to the motor as a result of the first motor drive signal, while no current flows to the second control circuit.

The first control circuit stops the first motor drive signal. The first control circuit is in the high impedance state to the input of the second motor drive signal. The second control circuit then outputs the second motor drive signal to the motor. The current flows to the motor as a result of the second motor drive signal and does not flow to the control circuit. The first control circuit and the second control circuit control the motor.

When there is one of the control circuits, the scale of the circuit increases, and the labor relating to the modification is greater. When the control circuit is configured by two circuits, the scale of each of the circuits can be reduced. When the scale of the circuit is small, the labor required for the modification is small. The function for which the possibility of modification is small is built into the first control circuit, and the function for which the possibility of modification is large is built into the second control circuit. In this way, when the control circuit is modified, the possibility is increased of limiting the modification to the second control circuit. Thus, the control circuit can be modified in an efficient manner.

An electronic watch includes a motor configured to drive a pointer, a control circuit electrically coupled to the motor and configured to output a first motor drive signal, and a inspection terminal electrically coupled to the motor and to which a second motor drive signal is input. When the second motor drive signal is input to the inspection terminal, the control circuit is in a high impedance state to input of the second motor drive signal.

According to this configuration, the control circuit and the inspection terminal are electrically coupled to the motor that drives the pointer. When outputting the second motor drive signal from the inspection terminal to the motor, the control circuit is in the high impedance state to the input of the second motor drive signal. Thus, the current flows to the motor as a result of the second motor drive signal and does not flow to the control circuit.

The waveform and frequency of the signal waveform of the second motor drive signal can be changed to test the characteristics of the motor. At this time, the current flows to the motor and does not flow to the control circuit, and it is thus possible to accurately test the characteristics of the motor.

A test method is a test method for an electronic watch including a a motor that drives a pointer, a control circuit electrically coupled to the motor and outputting a first motor drive signal, and a inspection terminal electrically coupled to the motor and to which a second motor drive signal is input. The test method includes setting the control circuit to a high impedance state to input of the second motor drive signal, and driving the motor by the second motor drive signal input from the inspection terminal.

According to the test method for the electronic watch, the electronic watch includes the control circuit that outputs the first motor drive signal to the motor, and the inspection terminal into which the second motor drive signal is input. The control circuit is in the high impedance state to the input of the second motor drive signal. Next, the second motor drive signal is output from the inspection terminal to the motor. The current from the second motor drive signal flows to the motor and does not flow to the control circuit.

The waveform and frequency of the signal waveform of the second motor drive signal can be changed to test the characteristics of the motor. At this time, the current flows to the motor and does not flow to the control circuit, and it is thus possible to accurately test the characteristics of the motor.

What is claimed is:

1. An electronic watch comprising:
a motor configured to drive a pointer;
a first control circuit electrically coupled to the motor and configured to output a first motor drive signal; and
a second control circuit electrically coupled to the motor and configured to output a second motor drive signal, wherein
when the first control circuit outputs the first motor drive signal, the second control circuit is in a high impedance state to an input of the first motor drive signal,
when the second control circuit outputs the second motor drive signal, the first control circuit is in a high impedance state to an input of the second motor drive signal,
the motor has a first wiring terminal and a second wiring terminal,
the first control circuit is connected to the first wiring terminal and the second wiring terminal,
the second control circuit is connected to the first wiring terminal and the second wiring terminal,
when outputting the first motor drive signal, the first control circuit drives the motor, independently of the second control circuit, by repeatedly causing current to flow from the first wiring terminal to the second wiring terminal and causing current to flow from the second wiring terminal to the first wiring terminal, and
when outputting the second motor drive signal, the second control circuit drives the motor, independently of the first control circuit, by repeatedly causing current to flow from the first wiring terminal to the second wiring terminal and causing current to flow from the second wiring terminal to the first wiring terminal.

2. The electronic watch according to claim 1, wherein
the first motor drive signal has a first pulse waveform that rotates the motor, the first pulse waveform being output at a predetermined interval to rotate the motor, and
the second motor drive signal has a second pulse waveform that rotates the motor and is selected from among a plurality of pulse waveforms having different pulse widths, the second pulse waveform being output at a time interval shorter than the predetermined interval to rotate the motor.

3. The electronic watch according to claim 1, wherein
a plurality of the motors are electrically coupled to the first control circuit and the second control circuit.

4. The electronic watch according to claim 2, wherein
a plurality of the motors are electrically coupled to the first control circuit and the second control circuit.

5. A control method for an electronic watch including a motor that drives a pointer, a first control circuit electrically coupled to the motor and outputting a first motor drive signal, and a second control circuit electrically coupled to the motor and outputting a second motor drive signal, the control method comprising:
setting the second control circuit to a high impedance state to input of the first motor drive signal;
causing the first control circuit to output the first motor drive signal to the motor;
stopping the first control circuit from outputting the first motor drive signal;
setting the first control circuit to a high impedance state to input of the second motor drive signal;
causing the second control circuit to output the second motor drive signal to the motor, wherein
the motor has a first wiring terminal and a second wiring terminal,
the first control circuit is connected to the first wiring terminal and the second wiring terminal, and
the second control circuit is connected to the first wiring terminal and the second wiring terminal;
when outputting the first motor drive signal, driving the motor using the first control circuit by repeatedly causing current to flow from the first wiring terminal to the second wiring terminal and causing current to flow from the second wiring terminal to the first wiring terminal; and
when outputting the second motor drive signal, driving the motor using the second control circuit by repeatedly causing current to flow from the first wiring terminal to the second wiring terminal and causing current to flow from the second wiring terminal to the first wiring terminal.

6. An electronic watch comprising:
a motor configured to drive a pointer;
first control circuit electrically coupled to first and second wiring terminals of the motor and configured to output a first motor drive signal;
a second control circuit electrically coupled to the first and second wiring terminals and configured to output a second motor drive signal; and
an inspection terminal electrically coupled to the motor and to which a second motor drive signal is input, wherein
when the second motor drive signal is input to the inspection terminal, the control circuit is in a high impedance state to input of the second motor drive signal,
when outputting the first motor drive signal, the first control circuit drives the motor, independently of the second control circuit, by repeatedly causing current to flow from the first wiring terminal to the second wiring terminal and causing current to flow from the second wiring terminal to the first wiring terminal, and
when outputting the second motor drive signal, the second control circuit drives the motor, independently of the first control circuit, by repeatedly causing current to flow from the first wiring terminal to the second wiring terminal and causing current to flow from the second wiring terminal to the first wiring terminal.

* * * * *